United States Patent
Li et al.

(10) Patent No.: US 10,048,453 B2
(45) Date of Patent: Aug. 14, 2018

(54) OPTICAL ALIGNMENT STRUCTURE AND METHOD OF DETERMINING ALIGNMENT INFORMATION

(71) Applicant: Agency for Science, Technology and Research, Singapore (SG)

(72) Inventors: Chao Li, Singapore (SG); Huijuan Zhang, Singapore (SG); Guo-Qiang Patrick Lo, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 118 days.

(21) Appl. No.: 14/760,524

(22) PCT Filed: Jan. 15, 2014

(86) PCT No.: PCT/SG2014/000015
§ 371 (c)(1),
(2) Date: Jul. 13, 2015

(87) PCT Pub. No.: WO2014/112949
PCT Pub. Date: Jul. 24, 2014

(65) Prior Publication Data
US 2015/0355421 A1    Dec. 10, 2015

(30) Foreign Application Priority Data
Jan. 15, 2013    (SG) .................................. 201300325

(51) Int. Cl.
*G02B 6/42* (2006.01)
*G01B 11/27* (2006.01)
(Continued)

(52) U.S. Cl.
CPC .......... *G02B 6/4225* (2013.01); *G01B 11/272* (2013.01); *G02B 6/125* (2013.01);
(Continued)

(58) Field of Classification Search
CPC .................................................... G02B 6/4225
(Continued)

(56) References Cited

U.S. PATENT DOCUMENTS

| 5,619,368 A * | 4/1997 | Swanson | ............... G02F 1/3536 |
| | | | 359/326 |
| 6,654,523 B1 | 11/2003 | Cole | |

(Continued)

OTHER PUBLICATIONS

Liu et al., "Wavelength Division Multiplexing Based Photonic Integrated Circuits on Silicon-on-Insulator Platform," IEEE Journal of Selected Topics in Quantum Electronics, vol. 16, No. 1, 2010, pp. 23-32.
(Continued)

*Primary Examiner* — Tarifur Chowdhury
*Assistant Examiner* — Omar Nixon
(74) *Attorney, Agent, or Firm* — Winstead, P.C.

(57) ABSTRACT

In various embodiments, an optical alignment structure may be provided. The optical alignment structure may include a light carrying structure configured to receive an input optical light from an external light source. The optical alignment structure may further include a light redirection mechanism coupled to the light carrying structure. The light redirection mechanism may be configured to receive the input optical light from the light carrying structure. The light redirection mechanism may be further configured to redirect the input optical light back to the light carrying structure, the redirected input optical light configured to be detected by a detector for alignment of the optical alignment structure with the external optical source.

11 Claims, 18 Drawing Sheets

(51) Int. Cl.
G02B 6/125 (2006.01)
G02B 6/293 (2006.01)
G02B 6/34 (2006.01)

(52) U.S. Cl.
CPC ............. *G02B 6/2934* (2013.01); *G02B 6/34* (2013.01); *G02B 6/4222* (2013.01)

(58) Field of Classification Search
USPC ........................................................ 356/400
See application file for complete search history.

(56) References Cited

U.S. PATENT DOCUMENTS

| | | | |
|---|---|---|---|
| 7,378,861 B1 | 5/2008 | Malendevich et al. | |
| 2002/0037135 A1* | 3/2002 | Atieh | G01M 11/00 385/37 |
| 2003/0043862 A1* | 3/2003 | Jacobowitz | G02B 6/29371 372/20 |
| 2005/0135733 A1* | 6/2005 | Reid | G02B 6/4246 385/15 |
| 2008/0240727 A1* | 10/2008 | Kawashima | G02B 6/12007 398/147 |
| 2008/0273835 A1* | 11/2008 | Popovic | G02B 6/12007 385/27 |
| 2010/0053712 A1* | 3/2010 | Carothers | G02F 1/225 359/108 |
| 2010/0238450 A1* | 9/2010 | Wang | G01C 19/722 356/460 |
| 2011/0037972 A1* | 2/2011 | Bergh | G01C 19/72 356/73.1 |
| 2011/0194808 A1 | 8/2011 | Kim et al. | |
| 2012/0134628 A1* | 5/2012 | Hoekman | G02B 6/12007 385/50 |

OTHER PUBLICATIONS

Chen et al, "Integrated GHz Silicon Photonic Interconnect with Micrometer-Scale Modulators and Detectors," Optics Express, vol. 17, No. 17, Aug. 17, 2009, pp. 15248-15256.

DeVos et al., "Silicon-on-Insulator Microring Resonator for Sensitive and Label-Free Biosensing," Optucs Express, vol. 15, No. 12, Jun. 11, 2007, pp. 7610-7615.

Zimmermann et al., "Packaging and Assembly for Integrated Photonics—A Review of the ePIXpack Photonics Packaging Platform," IEEE Journal of Selected Topics in Quantum Electronics, vol. 17, No. 3, 2011, pp. 645-651.

Galan et al., "CMOS Compatible Silicon Etched V-grooves Integrated with a SOI Fiber Coupling Technique for Enhancing Fiber-to-Chip Alignment," 6th IEEE International Conference on Group IV Photonics, United States, 2009, pp. 148-150.

Song et al., "Si-Photonics Based Passive Device Packaging and Module Performance," Optics Express, vol. 19, No. 19, Sep. 12, 2011, pp. 18020-18028.

Loh et al., "CMOS Compatible Integration of Si/SiO2 Multilayer GRIN Lens Optical Mode Size Converter to Si Wire Waveguide," Optics Express, vol. 20, No. 14, Jul. 2, 2012, pp. 14769-14778.

International Preliminary Report on Patentability for International Application No. PCT/SG2014/000015 dated Sep. 12, 2014, pp. 1-17.

* cited by examiner

FIG. 9

900 coupling an input optical light to the optical alignment structure

902 detecting the input optical light redirected by the optical alignment structure

904 determining information about alignment of the alignment fiber to the optical alignment structure based on the input optical light redirected by the optical alignment structure

906

OPTICAL ALIGNMENT STRUCTURE AND METHOD OF DETERMINING ALIGNMENT INFORMATION

CROSS-REFERENCE TO RELATED APPLICATIONS

This application claims the benefit of priority of Singapore application No. 201300325-6 filed Jan. 15, 2013, the contents of it being hereby incorporated by reference in its entirety for all purposes.

TECHNICAL FIELD

Various aspects of this disclosure relate to optical alignment structures and method of determining information about alignment of fibers to optical alignment structures.

BACKGROUND

In recent years, silicon photonics has seen substantial technological achievements beyond early expectations. Low loss high-index contrast silicon sub-micron nanowire waveguides that can be fabricated by standard complementary metal oxide semiconductor (CMOS)-compatible processes are showing promise as realistic dense photonic integrated circuits (PICs) in various applications including optical communications, optical interconnects, signal processing and sensing. Compared with hybrid integration and freespace optical subassembly, the silicon PICs can significantly reduce the device footprint and packaging cost of optical communications modules.

In order to realize practical applications of silicon photonics device, the PIC must be packaged to couple to the optical fibers (e.g. single mode fibers) with high efficiency. This is a key challenge in the development of highly integrated silicon photonic circuits because of the large mode size mismatch between the optical fiber and high-index contrast silicon sub-micron waveguides. Even with mode size converters integrated with the silicon waveguides (invert taper is often used to enlarge the mode size of the silicon waveguide), the optical connection requires extremely accurate alignment, precise placement and robust attachment. The tight tolerance of the fiber alignment with silicon waveguide becomes a challenging issue in silicon photonics device packaging.

SUMMARY

In various embodiments, an optical alignment structure may be provided. The optical alignment structure may include a light carrying structure configured to receive an input optical light from an external light source. The optical alignment structure may further include a light redirection mechanism coupled to the light carrying structure. The light redirection mechanism may be configured to receive the input optical light from the light carrying structure. The light redirection mechanism may be further configured to redirect the input optical light back to the light carrying structure, the redirected input optical light configured to be detected by a detector for alignment of the optical alignment structure with the external optical source.

In various embodiments, a method of determining information about alignment of an alignment fiber to an optical alignment structure may be provided. The method may include coupling an input optical light to the optical alignment structure. The method may also include detecting the input optical light redirected by the optical alignment structure. The method may further include determining information about alignment of the alignment fiber to the optical alignment structure based on the input optical light redirected by the optical alignment structure.

BRIEF DESCRIPTION OF THE DRAWINGS

The invention will be better understood with reference to the detailed description when considered in conjunction with the non-limiting examples and the accompanying drawings, in which:

FIG. 9 is a schematic showing a method of determining information about alignment of an alignment fiber to an optical alignment structure according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized, and structural and logical changes may be made without departing from the scope of the invention. The various embodiments are not, necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

Figure 1:
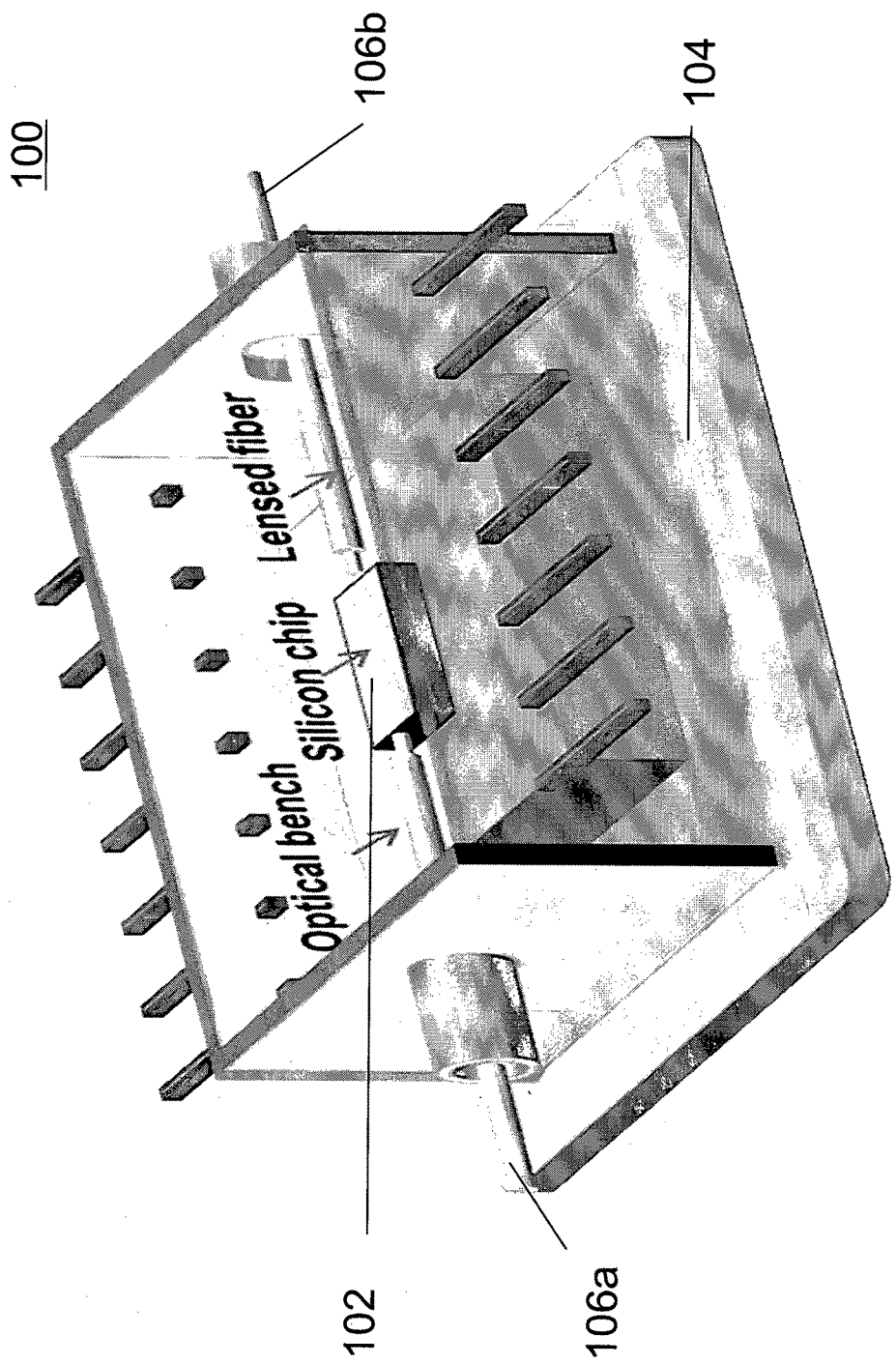
FIG. 1 shows a schematic of a typical double end silicon chip photonics packaging.

FIG. 1 shows a schematic 100 of a typical double end silicon chip photonics packaging. The silicon chip 102 is attached on the optical bench 104. Optical fibers 106a, 106b are aligned with the sub-micron waveguides in the silicon chip 102. The electrical connection to the pins on the casing may be done by wire bonding.

Silicon photonics packaging with fiber assembly follows two approaches: (1) lateral coupling (in plane) and (2) vertical coupling (out of plane) using grating coupler.

Grating couplers may offer advantages such as compatibility with planar processing, the possibility for wafer-level testing, and relatively large alignment tolerances. However, the issues with mechanical stability and reliability while preserving at least partially the compactness of the underlying devices may become a drawback for such out of plane packaging approach.

Since vertical orientation is not easy to be adapted to standard layouts for optoelectronic devices where, quite often, there are horizontal (in-plane) orientation approaches, lateral coupling with integrated V-groove has been proposed to align the fiber passively. A V-groove may be formed on a substrate. An oxide layer may be on the substrate surrounding the V-groove. The oxide layer may be the buried oxide (BOX) of a silicon-on-insulator (SOI) wafer. A coupling structure may be formed on the oxide layer. The coupling structure may include an inverted taper coupled to a waveguide. An optical fiber may be coupled to the inverted taper. This method may require more fabrication effort and cost to achieve high precision. It may also introduce more constraints for the fabrication process integration, especially for the active silicon photonic integrated circuits.

This method may require the fiber assembly process to be done on the sub-assembly outside the packaging casing. Thus custom-made casing may be required in order to place the sub-assembly with fibers afterwards. Because of the bulky IR camera and lenses to be used during the packaging, the fiber alignment process may be difficult to be performed in the standard commercially available packaging facilities. Furthermore, the IR camera analog signal may less accurate compared with other digital detection instruments, such as photodetectors. The photodetector may also not help in such a high resolution demanded packaging process because the photodetector always collect the integrated light intensity with dimension of a few tens of micrometers. All the above factors may result in much more difficulties and challenges in silicon photonics packaging than expected.

Figure 2:
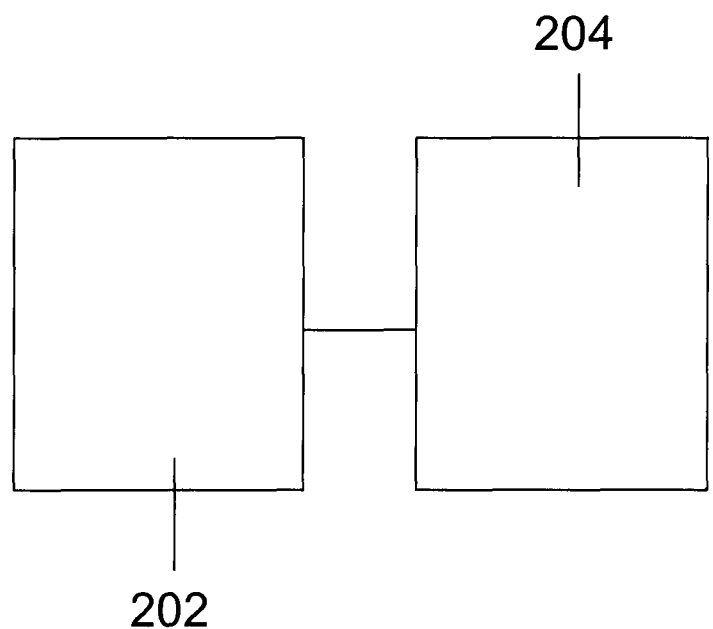
FIG. 2 shows a schematic of an optical alignment structure according to various embodiments.

FIG. 2 shows a schematic 200 of an optical alignment structure according to various embodiments. The optical alignment structure may include a light carrying structure 202 configured to receive an input optical light from an external light source. The optical alignment structure may further include a light redirection mechanism 204 coupled to the light carrying structure 202. The light redirection mechanism 204 may be configured to receive the input optical light from the light carrying structure 202. The light redirection mechanism 204 may be further configured to redirect the input optical light back to the light carrying structure 202, the redirected input optical light configured to be detected by a detector for alignment of the optical alignment structure with the external optical source.

In other words, an optical alignment structure may be provided according to various embodiments. The optical alignment structure may include a light carrying structure 202. The optical alignment structure may further include a light redirection mechanism 204 coupled to the light carrying structure 202. Optical light from an external optical source may travel along the light carrying structure 202 towards the light redirection mechanism 204. The light redirection mechanism 204 may be configured to redirect the optical light back to the light carrying structure 202. The redirected optical light may travel along the light carrying structure 202 to be detected by a detector.

Various embodiments may help to reduce or mitigate issues faced by prior art. Various embodiments may provide an easy way to align an optical fiber to an optical device structure such as an optical circuit or an optical component or a portion of an optical circuit or a portion of an optical component. Various embodiments may enable standardization of the silicon photonics packaging process with high repeatability. Various embodiments may provide or allow for a simple monitoring scheme, improve accuracy and/or provide higher yield due to standardization of the silicon photonics packaging process.

In various embodiments, the optical alignment structure may also be referred to as an auxiliary alignment structure (AAS).

Figure 3:
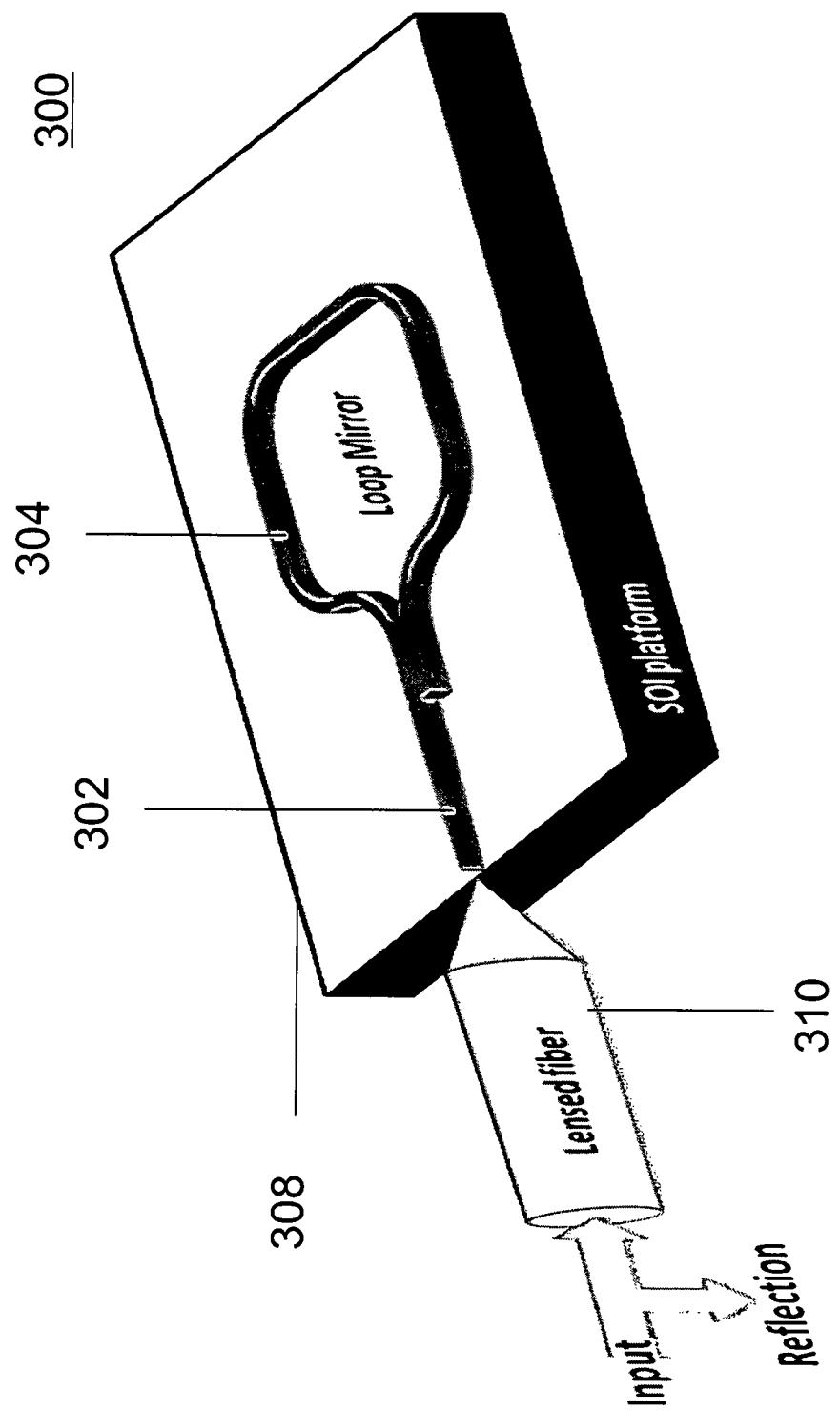
FIG. 3 shows a schematic of an optical alignment structure according to various embodiments.

FIG. 3 shows a schematic 300 of an optical alignment structure according to various embodiments. The optical alignment structure may include a light carrying structure 302 configured to receive an input optical light from an external light source. The optical alignment structure may further include a light redirection mechanism 304 coupled to the light carrying structure 302. The light redirection mechanism 304 may be configured to receive the input optical light from the light carrying structure 302. The light redirection mechanism 304 may be further configured to redirect the input optical light back to the light carrying structure 302, the redirected input optical light configured to be detected by a detector for alignment of the optical alignment structure with the external optical source.

In various embodiments, the light carrying structure 302 may be configured to carry the input optical light from the external optical source in a first direction. The light redirection mechanism 304 may be configured to redirect the input optical light back to the light carrying structure 302 in a second direction substantially opposite the first direction. In other words, the light redirection mechanism 304 may be configured to reflect the optical light travelling along the light carrying structure 302 back along the light carrying structure 302. The redirected input optical light may travel along the light carrying structure 302 in the second direction.

In various embodiments, the light redirection mechanism 302 may be or may include a loop mirror. The loop mirror may include a waveguide including a body with a first end and the second end, the body including a loop such that the first end and the second end are on the same side of the body. In other words, the waveguide may form a loop such that the first end and the second end are near or adjacent to each other. In various embodiments, the first end and the second end may be directly coupled to the light carrying structure 302.

The loop mirror may be configured such that input optical light received from the light carrying structure 302 may be split into a first component travelling in a first direction along the loop mirror and a second component travelling in a second direction along the loop mirror, the second direction along the loop mirror substantially opposite the first direction along the loop mirror. For instance, if the first component travels in a clockwise direction along the loop mirror, the second component may travel in an anticlockwise direction along the loop mirror. On the other hand, if the first component travels in an anticlockwise direction along the loop mirror, the second component may travel in a clockwise direction along the loop mirror.

In various embodiments, the light carrying structure 302 may include an optical coupler such as a waveguide. The optical coupler may be a 3-dB coupler.

In various embodiments, the redirected input optical light may be substantially the same as the input optical light. For instance, the intensity of the redirected input optical light may remain substantially the same as the input optical light. The intensity of the redirected input optical light may remain the same, after taking into account normal losses of the optical light travelling in the light carrying structure 302 and/or the light redirection mechanism 304, as the input optical light.

Figure 4A:
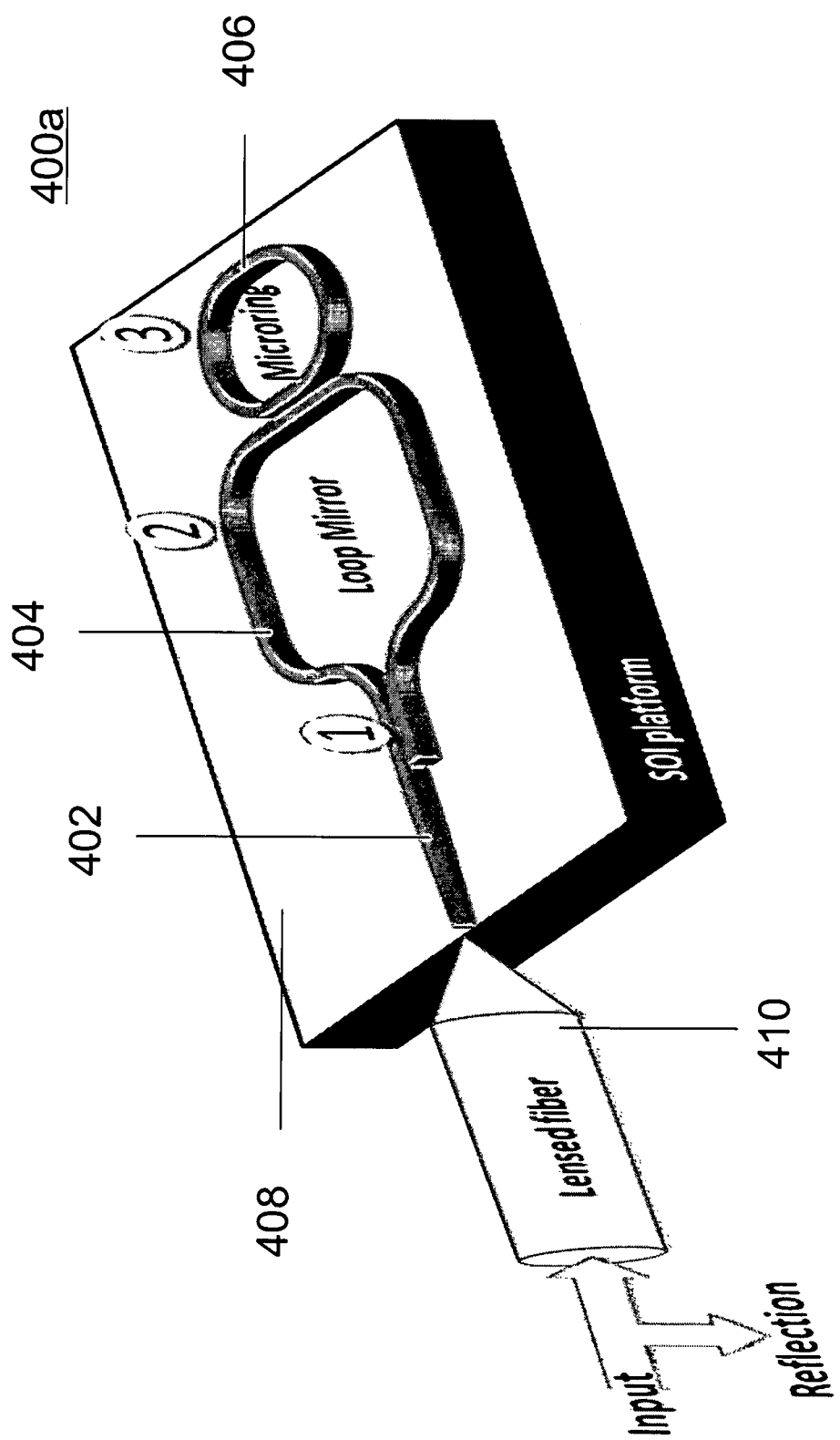
FIG. 4A shows a schematic of an optical alignment structure according to various embodiments.

FIG. 4A shows a schematic 400a of an optical alignment structure according to various embodiments. The optical alignment structure may include a light carrying structure 402 configured to receive an input optical light from an external light source. The optical alignment structure may further include a light redirection mechanism 404 coupled to the light carrying structure 402. The light redirection mechanism 404 may be configured to receive the input optical light from the light carrying structure 402. The light redirection mechanism 404 may be further configured to redirect the input optical light back to the light carrying structure 402, the redirected input optical light configured to be detected by a detector for alignment of the optical alignment structure with the external optical source.

In various embodiments, the optical alignment structure may include a microring resonator 406 coupled to the light redirection mechanism 404. The microring resonator 406 may be configured to decrease an intensity of the input optical light received from the light carrying structure 402 such that the intensity of the redirected input optical light has a lower intensity than the input optical light received from the light carrying structure 402. The microring resonator 406 may be configured to decrease an intensity of predetermined wavelengths or range of wavelengths of the input optical light.

Figure 4B:
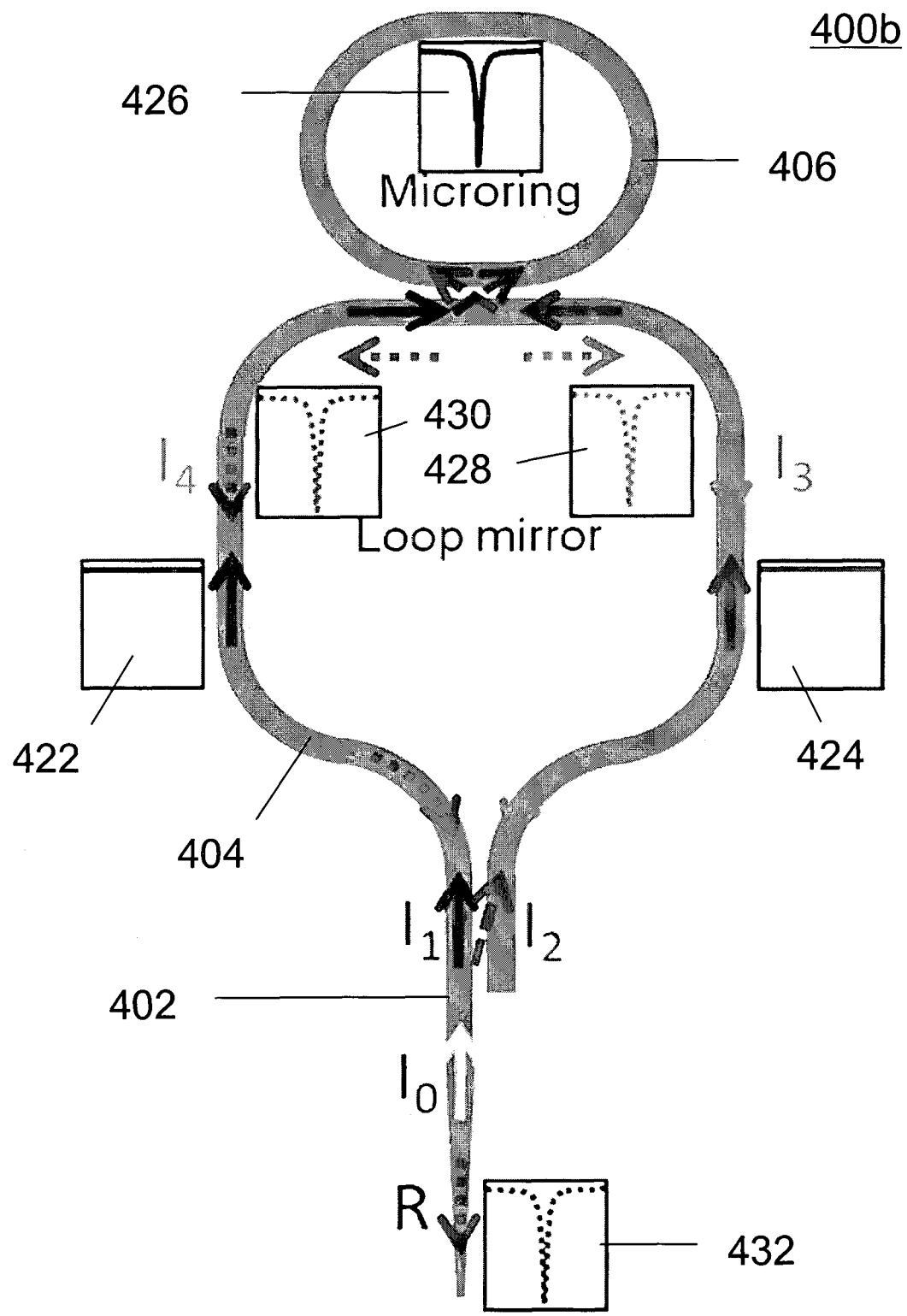
FIG. 4B shows a schematic illustrating the operation of the optical alignment structure shown in FIG. 4A according to various embodiments.

FIG. 4B shows a schematic 400b illustrating the operation of the optical alignment structure shown in FIG. 4A according to various embodiments. An input light $I_0$ may be coupled from an external light source through an alignment fiber to the light carrying structure 402. The input light $I_0$ may travel along the light carrying structure 402. A loop mirror 404 may be coupled to the light carrying structure 402. The loop mirror 404 may have a first end and a second end. Both the first end and the second end of the loop mirror 404 may be coupled to the light carrying structure 402 such as an optical coupler.

Upon reaching the loop mirror, the input light $I_0$ may be split into two separate lights $I_1$ and $I_2$. 422 shows the intensity profile (intensity against wavelength) of $I_1$ while 424 shows the intensity profile (intensity against wavelength) of $I_2$. As shown in FIG. 4B, $I_1$ may go into the first end of the loop mirror 404 and travel in a clockwise direction while $I_2$ may go into the second end of the loop mirror 404 and travel in a anti-clockwise direction. In other words, the loop mirror may be configured such that input optical light, i.e. $I_0$, received from the light carrying structure is split into a first component, i.e. $I_1$, travelling in a first direction along the loop mirror 404 and a second component, i.e. $I_2$, travelling in a second direction along the loop mirror 404, the second direction along the loop mirror 404 substantially opposite the first direction along the loop mirror 404.

The optical alignment structure may further include a microring resonator 406 coupled to the loop mirror 404. At least a portion of $I_1$ may be coupled into the microring resonator 406. Similarly, at least a portion of $I_2$ may be coupled into the microring resonator 406. When light having resonant wavelengths are coupled into the microring resonator 406, the light having the resonant wavelengths may build up intensity over multiple round trips within the microring resonator 406. 426 shows the throughput intensity profile (intensity against wavelength) of the optical light when coupling to the microring resonator 406. Consequently, the optical light exiting the microring resonator 406 may have decreased intensities at the resonant wavelengths. The decreased intensities may show as a resonant trough. In various alternate embodiments, the microring resonator 406 may be configured to increase intensity of the input optical light received from the light carrying structure such that the intensity of the redirected input optical light has a higher intensity than the input optical light received from the light carrying structure 402. The increased intensity may show as a resonant peak. The intensities of the redirected input optical light at the resonant wavelengths may be increased when other configurations are employed such as when the microring resonator 406 is waveguide cross-coupled to the light redirection mechanism 404, e.g. when a "U" shape waveguide is coupled to two different portions of the microring resonator 406 instead of single coupling portion as shown in FIG. 4B.

$I_3$ coupling out of the microring resonator 406 into loop mirror 404 may have the intensity profile 428. $I_3$ may be the throughput signal of $I_1$. $I_4$ coupling out of the microring resonator 406 into loop mirror 404 may have the intensity profile 430. $I_4$ may be the throughput signal of $I_2$. $I_3$ may travel in a clockwise direction while $I_4$ may travel in an anti-clockwise direction. $I_1$ and $I_2$ are spilt from $I_0$ and may have the same intensity profile over the same wavelengths. $I_3$ and $I_4$ are coupled from the same output resonator 406 and may have the same intensity profile over the same wavelengths. $I_3$ and $I_4$ may interfere with each other and combine at the junction of the first end and the second end of the loop mirror 404 with light carrying structure 402 to form redirected input optical light. As the redirected input optical light is combined from $I_3$ and $I_4$, the redirected input optical light may have a similar intensity profile 432 as $I_3$ and $I_4$. The reflection, R, may be provided by the equation (1):

$$R=4K(1-K) \quad (1)$$

where K is the coupling ratio of the light carrying structure 402

In various embodiments, K may be designed to be about 50%, thus the reflection of the optical alignment structure may be 100%.

The redirected input optical light may be redirected back to the alignment fiber and detected using a detector. By detecting for a decreased intensity at the resonant wavelengths, it is possible to know whether the alignment fiber has been aligned to the optical alignment structure.

In various alternate embodiments, the light redirection mechanism may include a Bragg grating. The Bragg grating may be configured to reflect predetermined wavelengths or a predetermined range of wavelengths of the input optical light and allow the remaining wavelengths of the input optical light to pass through. The redirected input optical light may thus consist of the reflected predetermined wavelengths or predetermined range of wavelengths.

The light redirection mechanism may generally include any structure or mechanism that serve to redirect or reflect optical light including any suitable reflectors or mirroring structures.

Figure 5A:
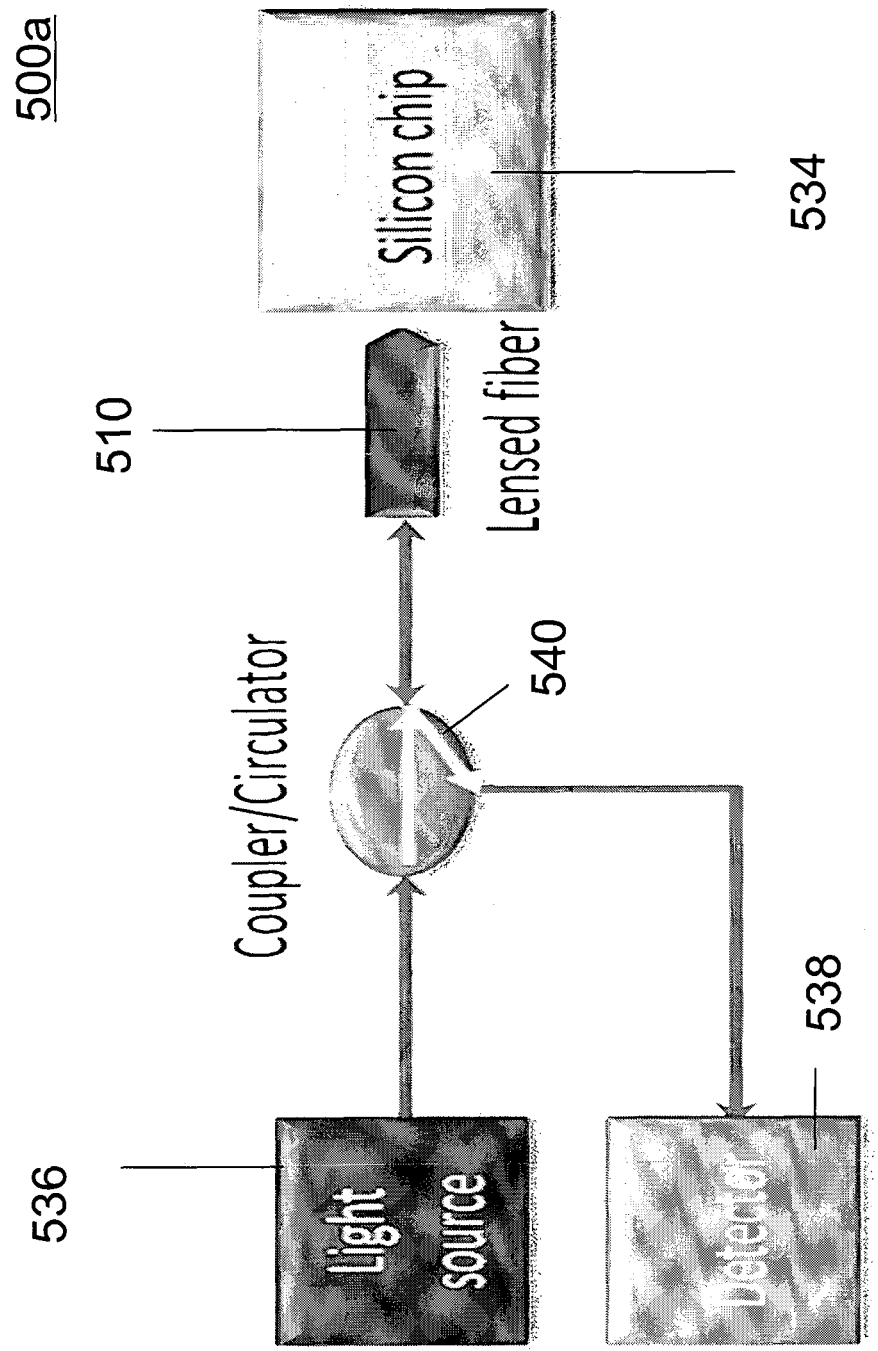
FIG. 5A shows a schematic of a setup to align an alignment fiber to an optical alignment structure in a silicon chip according to various embodiments.

FIG. 5A shows a schematic 500a of a setup to align an alignment fiber 510 to an optical alignment structure in a silicon chip 534 according to various embodiments. The alignment fiber 510 may be a lensed fiber. The silicon chip 534 may further include an optical device structure. The optical alignment structure may be at a predetermined distance to the optical device structure. A main optical fiber may be coupled to the alignment fiber 510. The main optical fiber may be aligned and/or coupled to the optical device structure by aligning the alignment fiber 510 to the optical alignment structure. The main optical fiber may be aligned and/or coupled laterally to the optical device structure. An alignment fiber 510 may also be referred to as an alignment optical fiber 510.

The alignment fiber 510 may be coupled to an external light source 536 through a light directing structure 540 such as a coupler or a circulator. The alignment fiber 510 may be coupled to a detector 538 through the light directing device 540. The light directing structure 540 may be configured to direct light from the external light source 536 to the alignment fiber 510. The light direction device 540 may be configured to direct light from the alignment fiber to the detector 538. In other words, the light direction device 540 may be configured to direct light travelling in a first direction from the external light source 536 to the alignment fiber 510 and may be further configured to direct light travelling in a second direction (opposite the first direction) from the alignment fiber 510 to the detector 538.

Figure 5B:
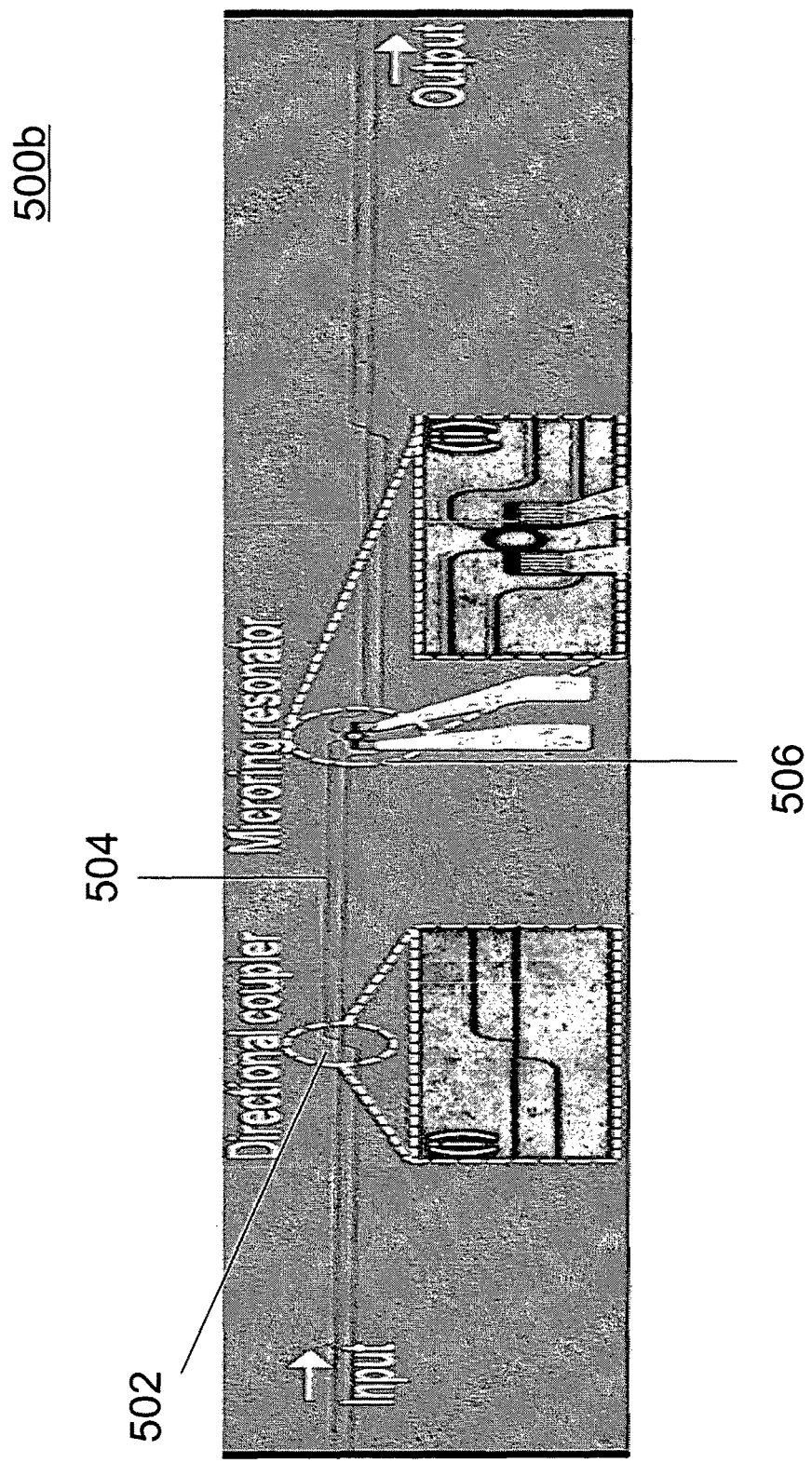
FIG. 5B shows a scanning electron microscope image of an optical alignment structure according to various embodiments.

FIG. 5B shows a scanning electron microscope image 500b of an optical alignment structure according to various embodiments. FIG. 5B shows a coupler 504 coupled to a loop mirror 506. The loop mirror is further coupled to a microring resonator 508.

Figure 5C:
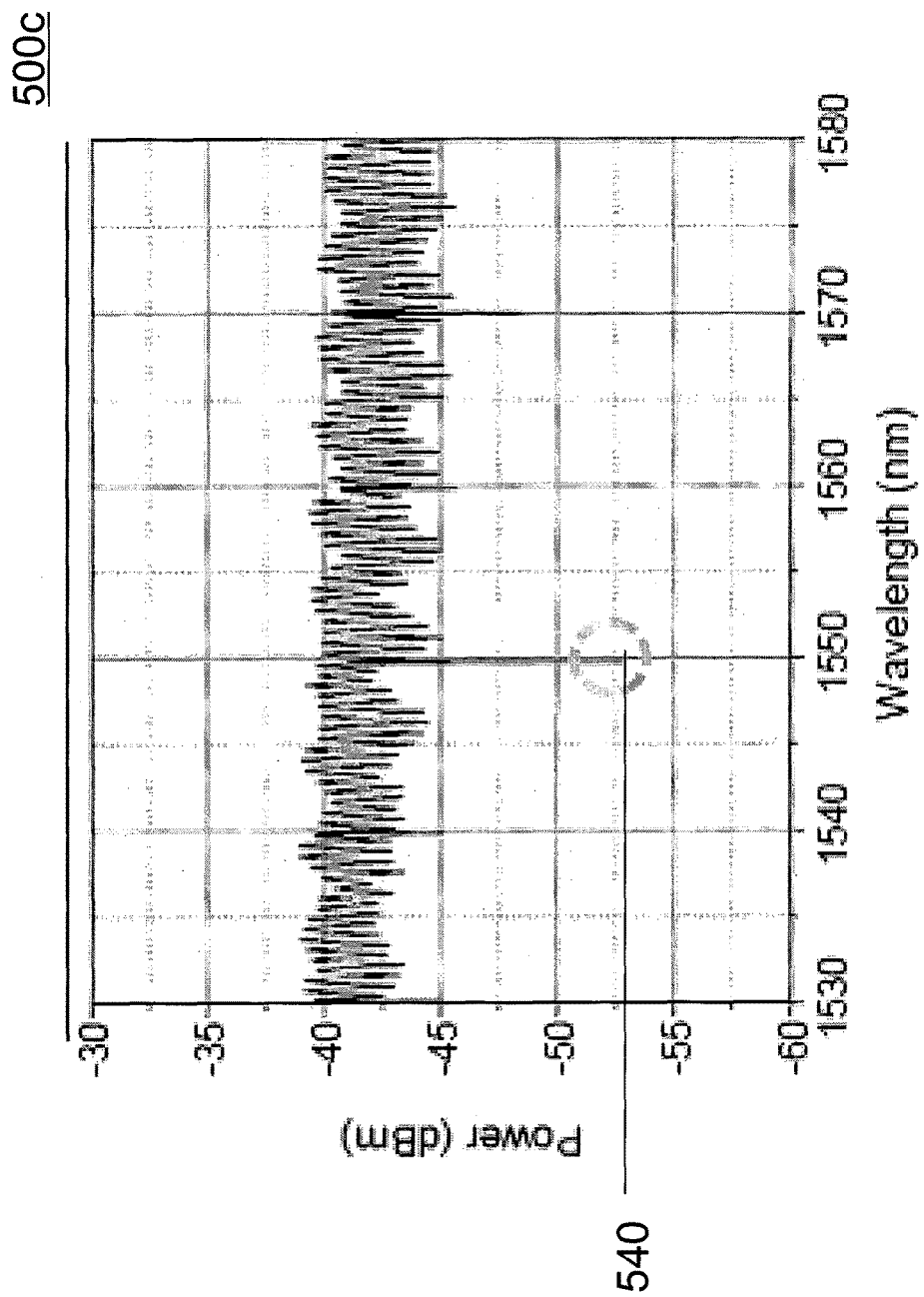
FIG. 5C shows a plot of measured power (dBm) against wavelength (nm) based on light detected at a detector when an alignment fiber is aligned to the optical alignment structure.

FIG. 5C shows a plot 500c of measured power (dBm) against wavelength (nm) based on light detected at a detector when an alignment fiber is aligned to the optical alignment structure. dBM is an abbreviation for the power ratio in decibels (dB) of the measured power referenced to one milliwatt (mW). As shown in FIG. 5C, there is a resonant trough 540 at, the resonant wavelength. The resonant trough 540 is caused by the microring resonator in the optical alignment structure and indicates that the detected optical light has been coupled into the microring resonator and has been redirected to the detector. As such, the resonant trough 540 may indicate that the alignment fiber has been aligned to the optical alignment structure or more specifically the light carrying structure of the optical alignment structure. Fine tuning or adjusting the alignment fiber to the optical alignment structure may be carried out by monitoring the intensity of the redirected input optical light. Various embodiments do not require other instruments such as cameras or photodetectors near the optical chip or optical device structure to assist in the alignment process. Various embodiments may provide for large freedom for the packaging process standardization with casing and fiber assembly. Various embodiments may be suitable for alignment of the alignment fiber to the optical device structure inside or outside a casing.

Figure 5D:
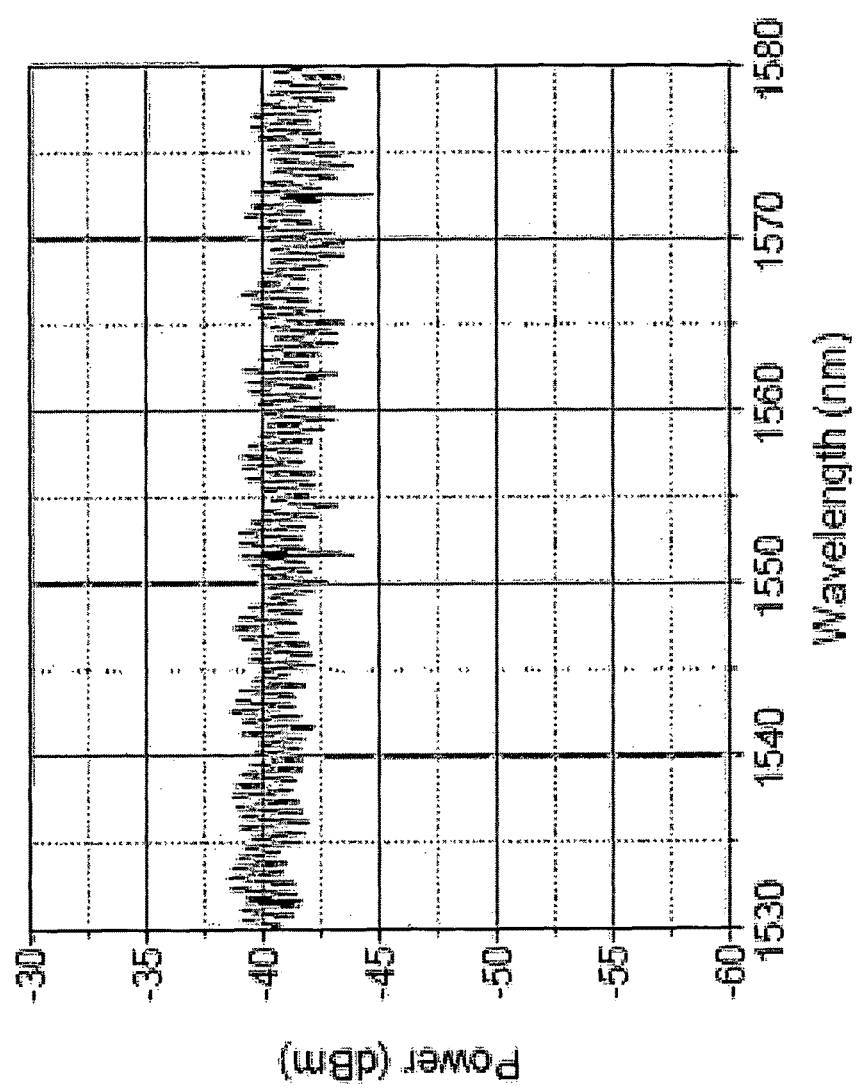
FIG. 5D shows a plot of measured power (dBm) against wavelength (nm) based on light detected at a detector when an alignment fiber is not aligned to the optical alignment structure.

FIG. 5D shows a plot 500d of measured power (dBm) against wavelength (nm) based on light detected at a detector when an alignment fiber is not aligned to the optical alignment structure. FIG. 5D does not shown any resonant trough which may indicate that the alignment fiber is not aligned to the optical alignment structure.

Figure 5E:
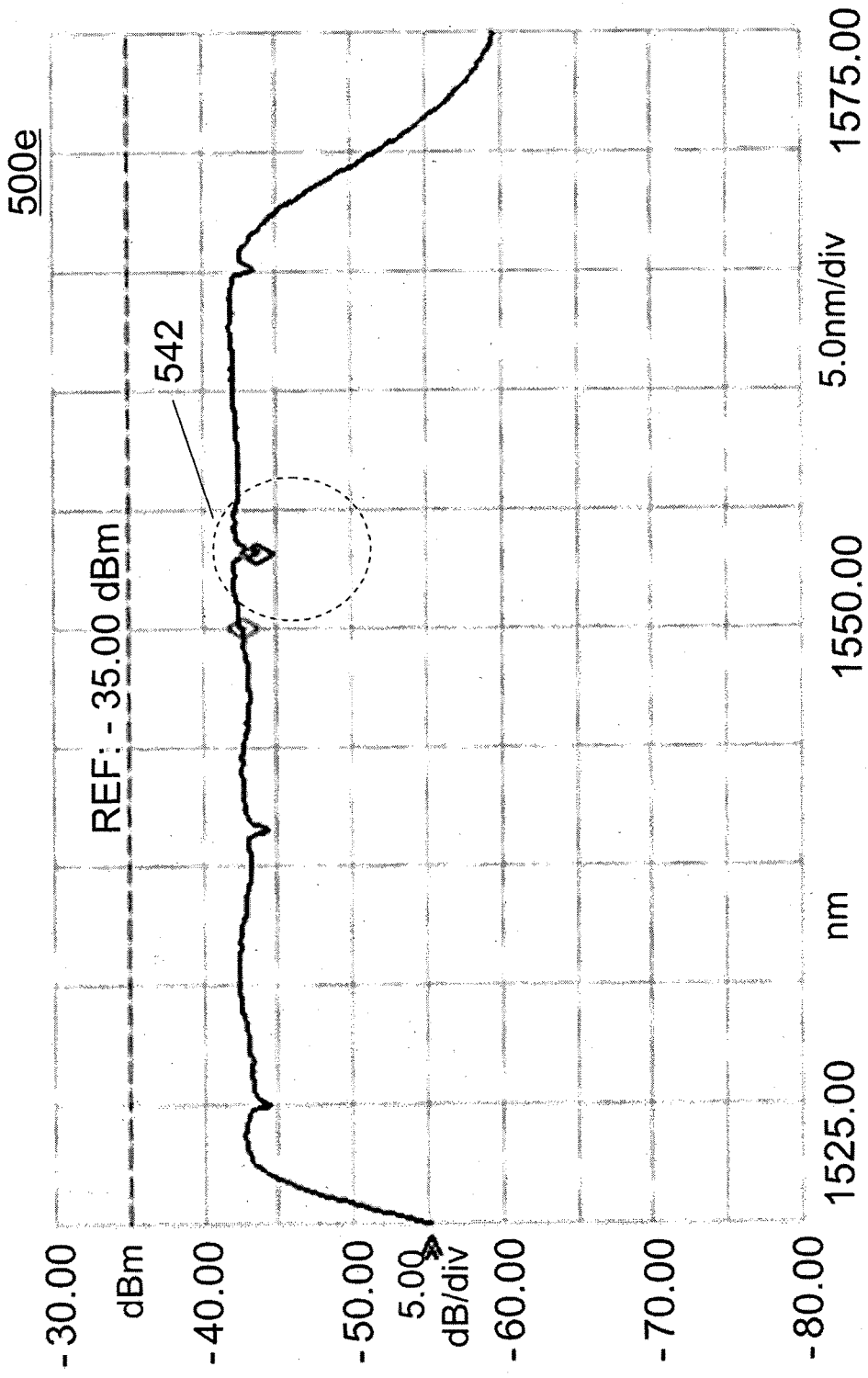
FIG. 5E shows a plot of measured power (dBm) against wavelength (nm) based on light detected at a detector when an alignment fiber is aligned to the optical alignment structure.

FIG. 5E shows a plot 500e of measured power (dBm) against wavelength (nm) based on light detected at a detector when an alignment fiber is aligned to the optical alignment structure. There is a resonant trough 542 at the resonant wavelength. The resonant trough 542 is caused by the microring resonator in the optical alignment structure. FIG. 5E is saved using Agilent Optical Spectrum Analyzer (OSA).

Figure 6A:
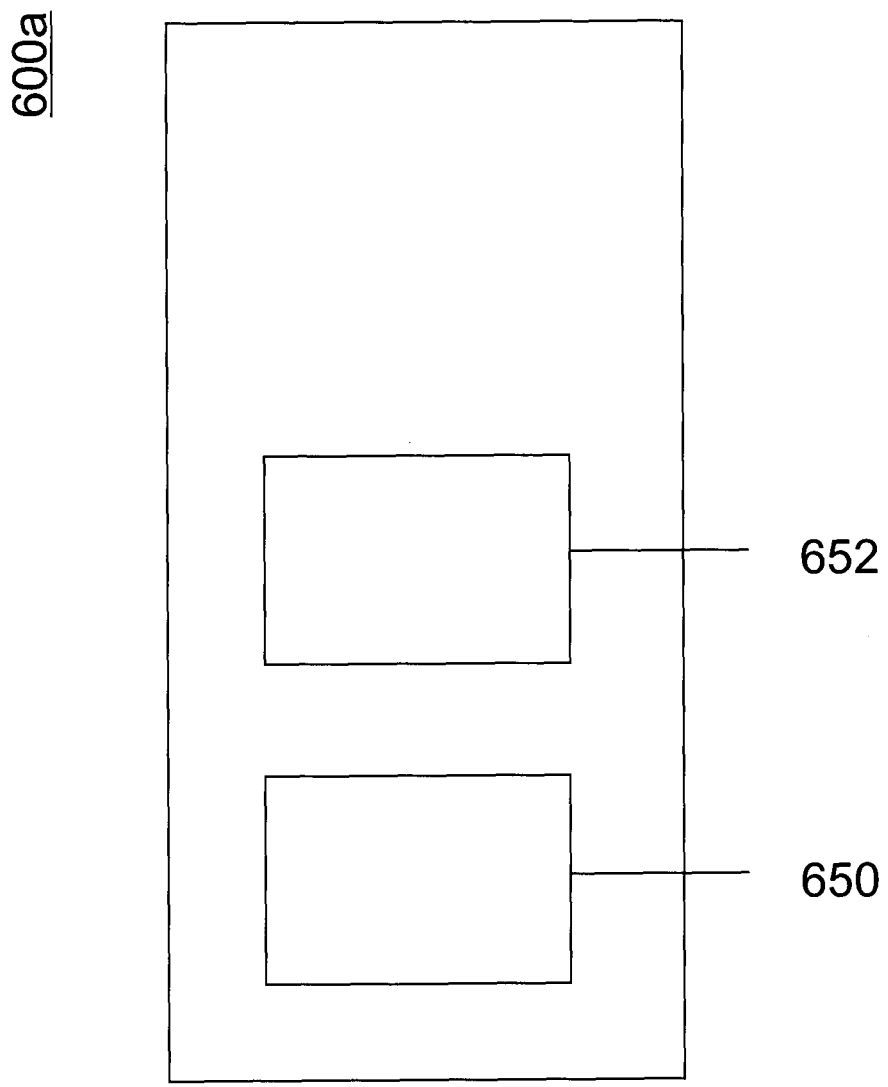
FIG. 6A is a schematic of an optical alignment assembly according to various embodiments.

(FIG. 6A is a schematic 600a of an optical alignment assembly according to various embodiments. In various embodiments, the optical alignment assembly may include an optical alignment structure 650. The optical alignment structure 650 may be or may include any one of the optical alignment structures illustrated in FIG. 2, FIG. 3 and FIG. 4A. The optical alignment assembly may further include an optical device structure 652.

For avoidance of doubt, the optical device structure 652 may be or may include any optical circuit arrangement (e.g. optical waveguides) or optical structures/components (e.g. laser diodes) or any structure including an optical circuit arrangement or optical structure/component.

The optical device structure 652 may include a device waveguide. A device waveguide may be any optical wave guide to be aligned. The optical alignment structure may be configured or may be used to align a main optical fiber to the device waveguide. A main optical fiber may be any optical fiber to be aligned to the device waveguide. The main optical fiber may or may not be substantially similar to an alignment fiber.

In various alternate embodiments, the optical device structure 652 may additionally or alternatively include a device optical component. A device optical component may be any optical component such as a photodiode or a laser diode to be aligned. The optical alignment structure may be configured or may be used to align a main optical fiber to the device optical component.

In various embodiments, the optical alignment structure 650 may be lateral to the optical device structure. In other words, the optical alignment structure 650 may be formed substantially horizontal to the optical device structure 652. When using a single optical alignment structure 650, the distance between the optical alignment structure 650 and the optical device structure 652 may not be set too large in order to achieve better accuracy along vertical direction.

In various embodiments, the optical alignment assembly may further include the external optical source. In various embodiments, the optical alignment assembly may further include a detector. In various embodiments, the optical alignment assembly may include an alignment fiber. The alignment fiber may be the alignment fiber 510 illustrated in FIG. 5A. The external optical source may be the optical source 536 illustrated in FIG. 5A. The detector may be the detector 538 illustrated in FIG. 5A. The alignment fiber may be coupled to the external optical source and the detector. The detector may be a photodetector.

The optical alignment structure 650 may be at a predetermined distance to the optical device structure 652. The optical alignment structure 650 may be fixed at the predetermined distance to the optical device structure 652, or more specifically to the device waveguide or device optical component of the optical device structure 652. In other words, the distance between the optical alignment structure 650 and the optical device structure 652 (or more specifically to the device waveguide or device optical component of the optical device structure 652) may be fixed, e.g. when forming the optical alignment structure 650 and the optical device structure 652 on or over a substrate.

In various embodiments, the alignment fiber may be used for aligning to the optical alignment structure 650, e.g. by monitoring the redirected input optical light using the detector. After the alignment fiber is aligned to the optical alignment structure 650, a position of the alignment fiber may be noted or determined. The position of the optical device structure (or more specifically to the device waveguide or device optical component of the optical device structure 652) may be determined based on the position of the alignment fiber and the predetermined distance. The main optical fiber may then be aligned to the optical device structure (or more specifically to the device waveguide or device optical component of the optical device structure 652). The main optical fiber may then be aligned to the optical device structure (or more specifically to the device waveguide or device optical component of the optical device structure 652) based on the determined position of the optical device structure (or more specifically to the device waveguide or device optical component of the optical device structure 652).

In various alternate embodiments, the alignment fiber may be at the (same) predetermined distance to the main optical fiber. The alignment fiber may be fixed at the (same) predetermined distance to the main optical fiber. In other words, the distance between the alignment fiber and the main optical fiber may be fixed to be substantially the same as the distance between the optical alignment structure and the optical device structure. For instance, the alignment fiber and the main optical fiber may be held together using a holding structure such that the alignment fiber and the main optical fiber is at the predetermined distance. The alignment fiber and the main optical fiber may be a fiber array or a portion of a fiber array. In various embodiments, the distance between the alignment fiber and the main optical fiber may be substantially the same as the distance between the light carrying structure of the optical alignment structure 650 and the device waveguide (or device optical component) of the optical device structure.

Consequently, the optical alignment structure 650 may be configured to align the main optical fiber to the device waveguide (or device optical component) by aligning the light carrying structure of the optical alignment structure 650 to the optical alignment fiber. In other words, as the distance between the alignment fiber and the main optical fiber is substantially the same as the distance between the light carrying structure of the optical alignment structure 650 and the device waveguide (or device optical component) of the optical device structure, aligning the optical alignment structure 650 to the optical alignment fiber may also align the main optical fiber to the device waveguide (or device optical component).

In various embodiments, the optical alignment structure 650 may be configured to be aligned to the optical alignment fiber by being configured to redirect optical light coupled from the external optical source through the optical alignment fiber back to the optical alignment fiber to be detected by the detector.

Figure 6B:
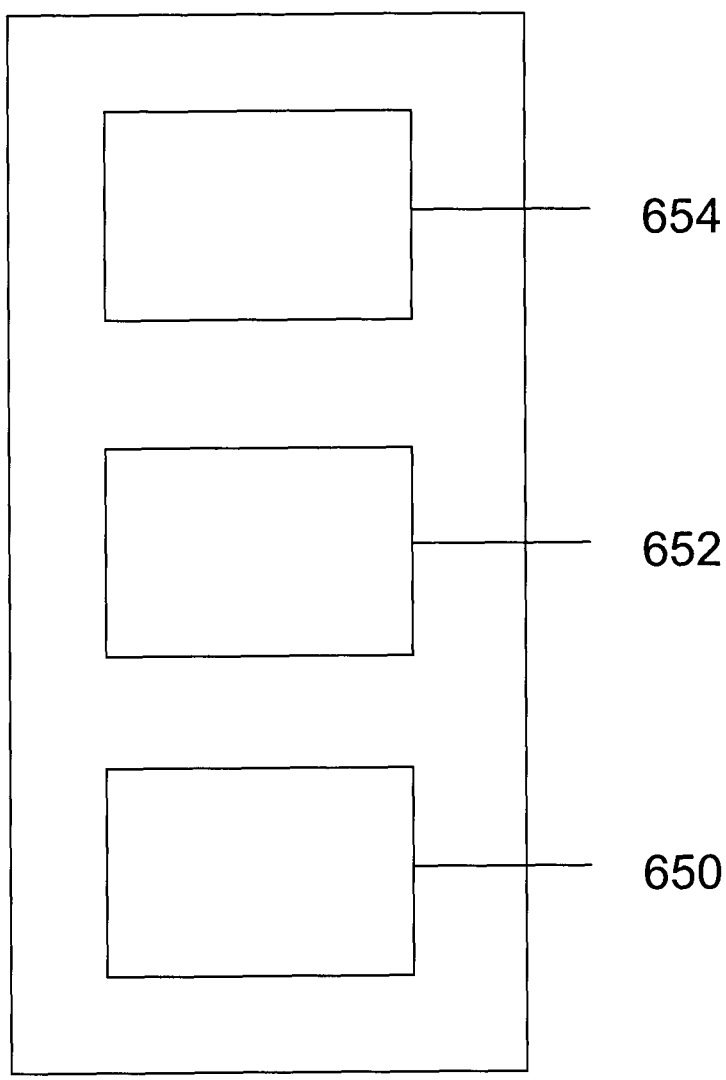
FIG. 6B is a schematic of an optical alignment assembly according to various embodiments.

FIG. 6B is a schematic 600b of an optical alignment assembly according to various embodiments. In various embodiments, the optical alignment assembly may include a further optical alignment structure 654. The optical alignment assembly may further include a further alignment fiber coupled to the external optical source and the detector.

The further optical alignment structure 654 may be at a further predetermined distance to the optical device structure 652. The further optical alignment structure 654 may be fixed at the further predetermined distance to the optical device structure 652. In other words, the distance between the further optical alignment structure 654 and the optical device structure 652 may be fixed, e.g. when forming the further optical alignment structure 654 and the optical device structure 652 on or over a substrate. In various embodiments, the predetermined distance and the further predetermined distance may be the same.

In various embodiments, the alignment fiber and the further alignment fiber may be used for aligning to the optical alignment structure 650 and further optical alignment structure 654 respectively, e.g. by monitoring the redirected input optical lights. The same detector or separate detectors may be used to monitor the redirected input optical lights from the optical alignment structure 650 and further optical alignment structure 654.

After the alignment fiber and further alignment fiber are aligned to the optical alignment structure 650 and further optical alignment structure 654 respectively, positions of the alignment fiber and further alignment fiber may be noted or determined. The position of the optical device structure (or more specifically to the device waveguide or device optical component of the optical device structure 652) may be determined based on the positions of the optical the alignment fiber and further alignment fiber as well as the predetermined distance and further predetermined distance. For instance, if the predetermined distance and the further predetermined distance are the same, the position of the optical device structure (or more specifically to the device waveguide or device optical component of the optical device structure 652) may be determined by simply averaging the coordinates of the positions of the alignment fiber and further alignment fiber. The main optical fiber may then be aligned to the optical device structure (or more specifically to the device waveguide or device optical component of the optical device structure 652).

Using two optical alignment structures may allow alignment of a main optical fiber to an optical device structure which is not lateral or not in the same horizontal plane as the optical alignment structures. For instance, the optical alignment structure may be formed on a first layer, the optical device structure may be formed on a second layer over the first layer and the further optical alignment structure may be formed on a third layer over the first and second layers. Using two optical alignment structures allows the vertical position of the optical device structure to be determined.

In various alternate embodiments, the further alignment fiber may be at the (same) further predetermined distance to the main optical fiber. The further alignment fiber may be fixed at the (same) further predetermined distance to the main optical fiber. In other words, the distance between the further alignment fiber and the main optical fiber may be substantially the same as the distance between the further optical alignment structure and the optical device structure. In various embodiments, the distance between the further alignment fiber and the main optical fiber may be substantially the same as the distance between the light carrying structure of the further optical alignment structure and the device waveguide (or device optical component) of the optical device structure. In various embodiments, the main optical fiber, the alignment fiber and the further alignment fiber may be held together by a holding structure. The alignment fiber, the further alignment fiber, and the main optical fiber may be a fiber array or a portion of a fiber array.

Consequently, the optical alignment structures 650, 654 may be configured to align the main optical fiber to the device waveguide (or device optical component) by aligning the light carrying structures of the optical alignment structures 650, 654 to the optical alignment fiber and further optical alignment fiber. In other words, as the distance between the alignment fiber and the main optical fiber is substantially the same as the distance between the light carrying structure of the optical alignment structure 650 and the device waveguide (or device optical component) of the optical device structure 652 and the distance between the further alignment fiber and the main optical fiber is substantially the same as the distance between the light carrying structure of the further optical alignment structure 654 and the device waveguide (or device optical component) of the optical device structure 652, aligning the optical alignment structure 650 to the alignment fiber and aligning the further optical alignment structure 654 to the further alignment fiber may also align the main optical fiber to the device waveguide (or device optical component).

In various embodiments, the further optical alignment structure 654 may be configured to be aligned to the further optical alignment fiber by being configured to redirect optical light coupled from the external optical source through the further optical alignment fiber back to the further optical alignment fiber to be detected by the detector or a separate detector.

Figure 7A:
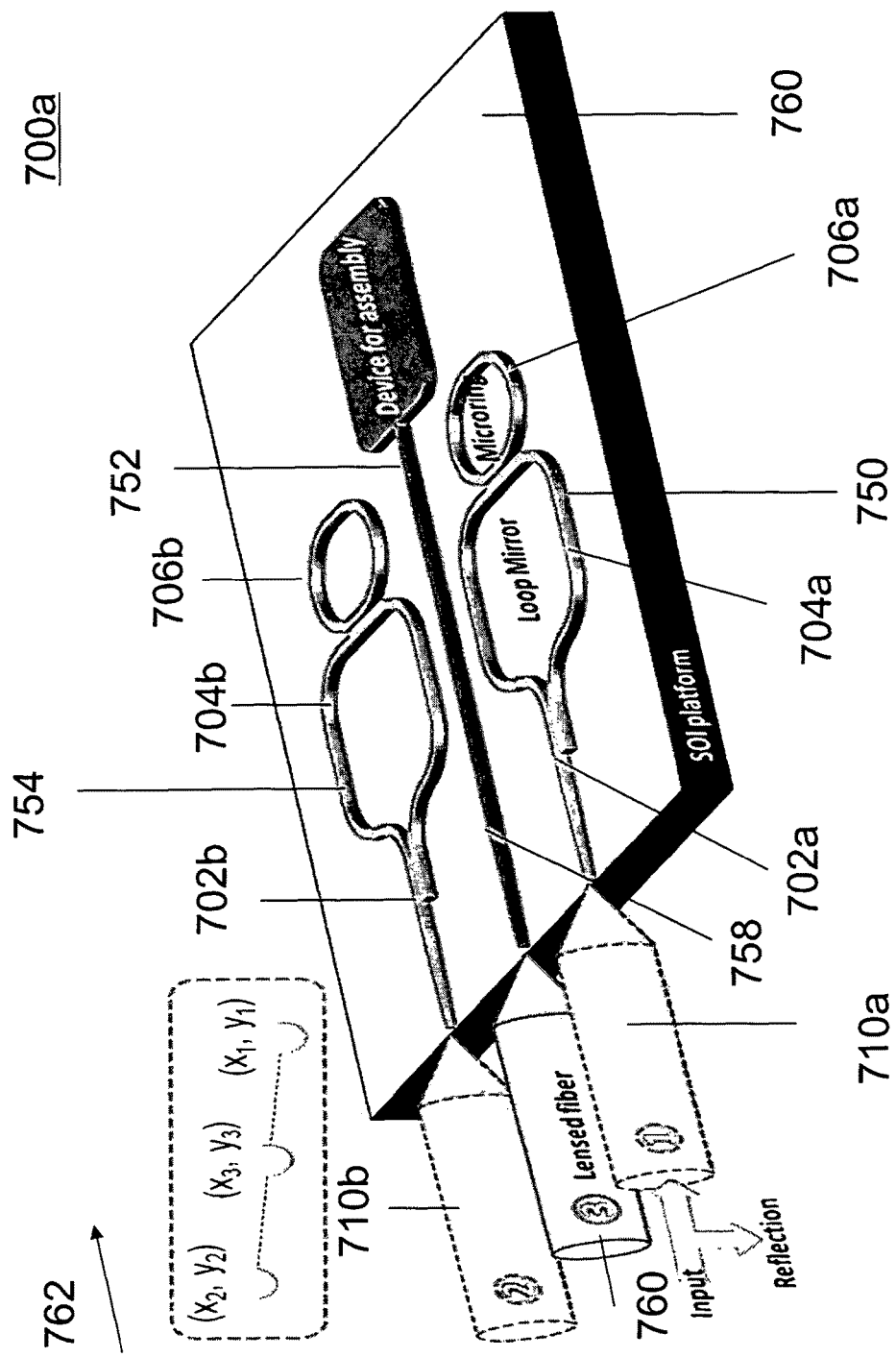
FIG. 7A is a schematic of an optical alignment assembly according to various embodiments.
Figure 7B:
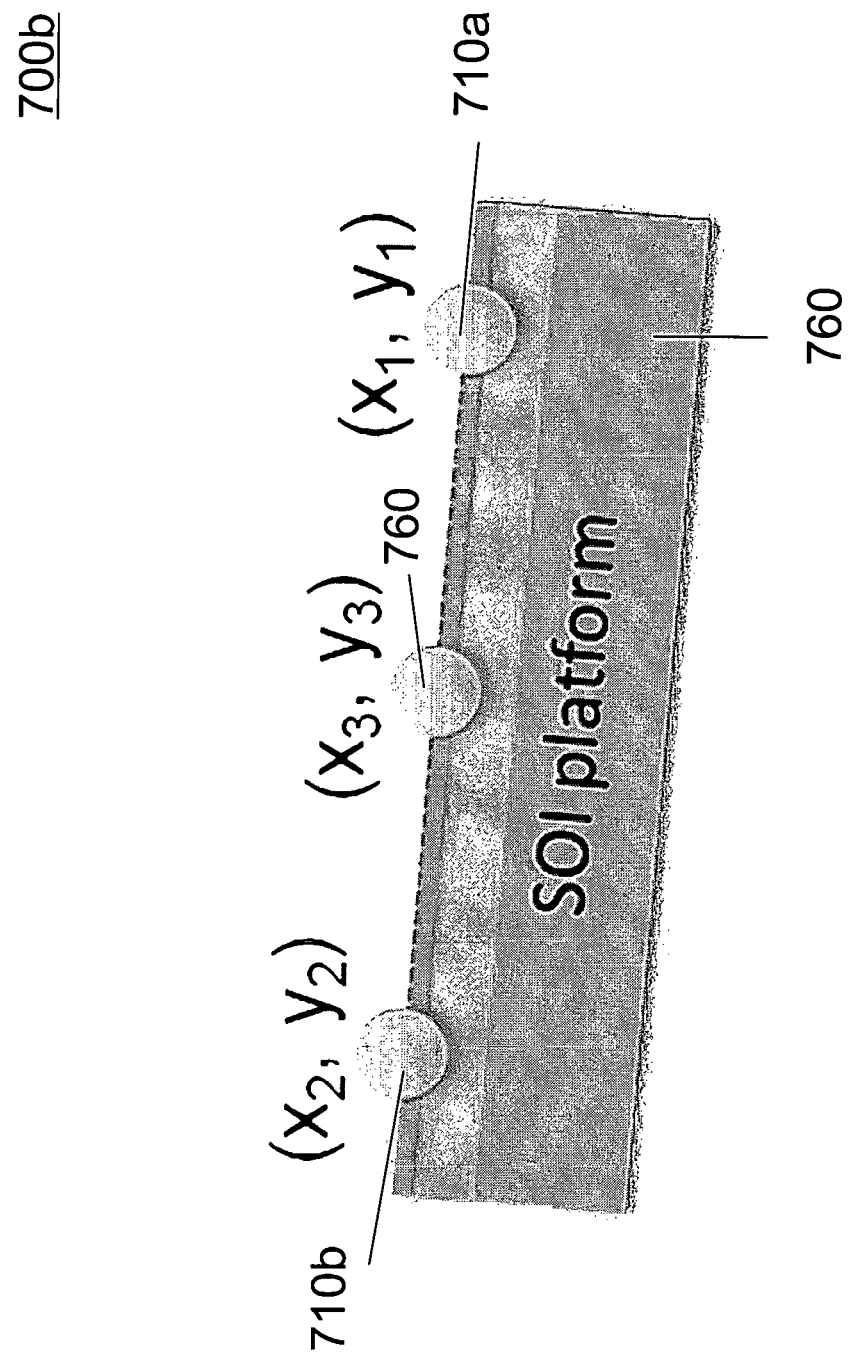
FIG. 7B is a schematic showing a cross-sectional side view of the optical alignment assembly in FIG. 7A.
Figure 7C:
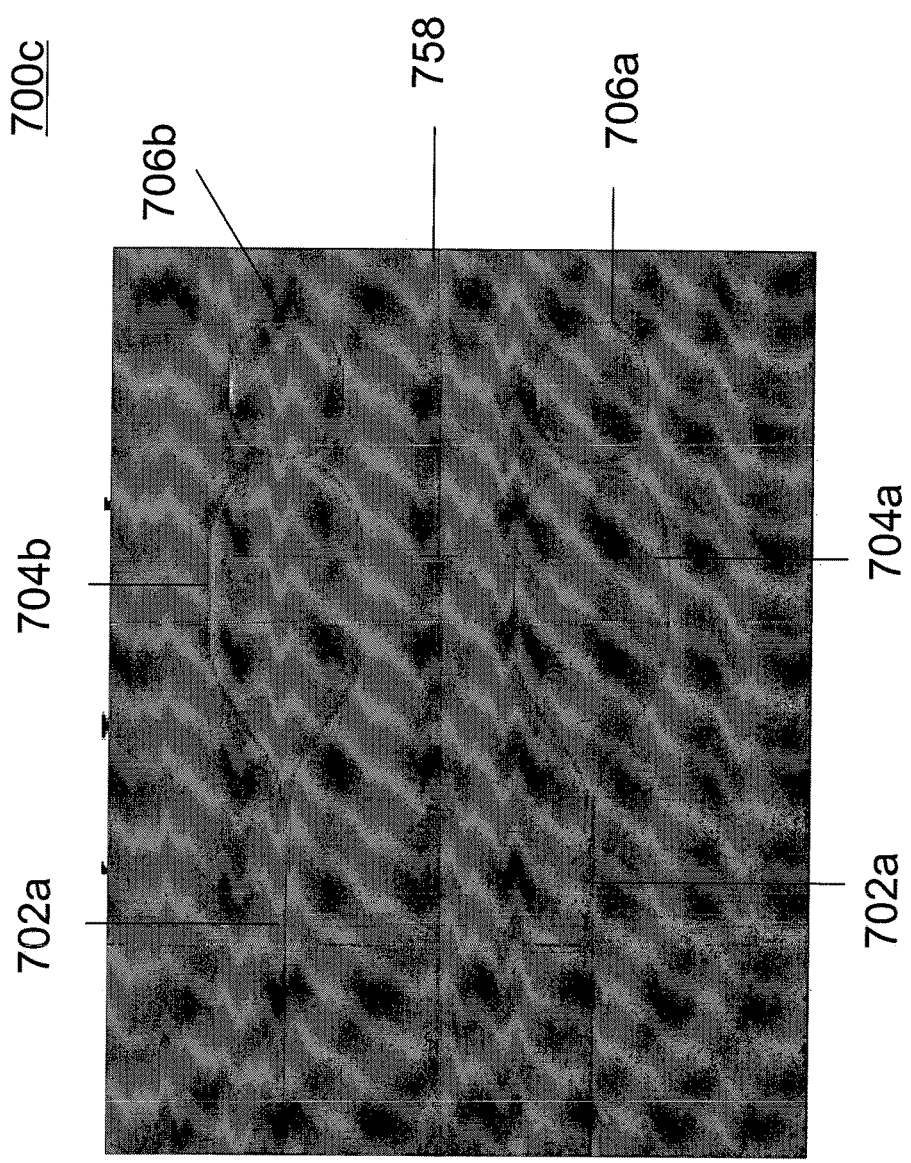
FIG. 7C is a scanning electron microscope image of the optical alignment assembly in FIG. 7A.

FIG. 7A is a schematic 700a of an optical alignment assembly according to various embodiments. FIG. 7B is a schematic 700b showing a cross-sectional side view of the optical alignment assembly in FIG. 7A. FIG. 7B corresponds to the view when viewed from the direction shown by arrow 762 in FIG. 7A. FIG. 7C is a scanning electron microscope image 700c of the optical alignment assembly in FIG. 7A.

The optical alignment assembly may include an optical alignment structure 750 and a further optical alignment structure 754. The optical alignment structure 750 may be or may include the optical alignment structure illustrated in FIG. 4A. Similarly, the further optical alignment structure 754 may be or may include the optical alignment structure illustrated in FIG. 4A. The optical alignment assembly may further include an optical device structure 752. The optical device structure 752 may include a device waveguide 758.

The optical alignment structure 750 may include a light carrying structure 702a configured to receive an input optical light from an external optical source. The optical alignment structure 750 may further include a light redirection mechanism 704a coupled to the light carrying structure 702a. The light redirection mechanism 704a may be configured to receive the input, optical light from the light carrying structure 702a. The light redirection mechanism 704a may be further configured to redirect the input optical light back to the light carrying structure 702a, the redirected input optical light configured to be detected by a detector for alignment of the optical alignment structure 750 with the external optical source. The optical alignment structure 750 may also include a microring resonator 706a coupled to the light redirection mechanism 704a.

The further optical alignment structure 754 may include a light carrying structure 702b configured to receive an input optical light from an external optical source. The further optical alignment structure 754 may further include a light redirection mechanism 704b coupled to the light carrying structure 702b The light redirection mechanism 704b may be configured to receive the input optical light from the light carrying structure 702b. The light redirection mechanism 704b may be further configured to redirect the input optical light back to the light carrying structure 702b, the redirected input optical light configured to be detected by a detector for alignment of the optical alignment structure 750 with the external optical source. The further optical alignment structure 754 may also include a microring resonator 706b coupled to the light redirection mechanism 704b.

In various embodiments, the external optical sources for emitting input optical light to the optical alignment structure 750 and the further alignment structure 754 may be the same optical source or may be separate optical sources.

In various embodiments, the detectors for detecting redirected input optical light from the optical alignment structure 750 and the further alignment structure 754 may be the same detector (or different parts of the same detector) or may be different detectors.

The predetermined distance between the device waveguide 758 and the light carrying structure 702a of the optical alignment structure 750 may be fixed. The predetermined distance between the device waveguide 758 and the light carrying structure 702b of the further optical alignment structure 754 may be fixed. The optical device structure 752, the optical alignment structure 750 and the further optical alignment structure 754 may be formed on a substrate 760 such as a silicon-on-insulator (SOI) substrate. In various embodiments, the optical alignment structure 750 and the further optical alignment structure 754 may be on opposite sides of the optical device structure 752. The optical alignment structure 750 may be lateral to the optical device structure 752. The further optical alignment structure 754 may be lateral to the optical device structure 752. The predetermined distance may be equal to the further predetermined distance.

A method of forming an optical alignment assembly may be provided according to various embodiments. The method may include forming the optical device structure 752 on a substrate 760. The method may further include forming the optical alignment structure 750 on the substrate 760. The method may further include forming the optical alignment structure 750 on the substrate 760. In various embodiments, the optical alignment structure 750 and the further optical alignment structure 754 may be formed using the same mask layer as the optical device structure or parts of the optical device structure (e.g. the waveguides). In various embodiments, forming the optical alignment structures 750, 754 may not affect the fabrication process. In other words, forming the optical alignment structures 750, 754 may not require additional processing steps. In various embodiments, the footprint of the optical alignment structures 750, 754 may be small. In various embodiments, the optical alignment structures 750, 754 may not affect fabrication costs.

In various embodiments, the alignment fiber 710a and the further alignment fiber 710b may be used for aligning to the optical alignment structure 750 and further optical alignment structure 754 respectively, e.g. by monitoring the redirected input optical lights. The same detector or separate detectors may be used to monitor the redirected input optical lights from the optical alignment structure 750 and further optical alignment structure 754. After the alignment fiber 710a and further alignment fiber 710b are aligned to optical alignment structure 750 and further optical alignment structure 754 respectively, positions of the alignment fiber 710a and further alignment fiber 710b may be noted or determined. The position of the optical device structure (or more specifically to the device waveguide or device optical component of the optical device structure 752) may be determined based on the positions of the alignment fiber 710a and further alignment fiber 710b as well as the predetermined distance and further predetermined distance.

For instance, if the predetermined distance and the further predetermined distance are the same, the position of the optical device structure (or more specifically the device waveguide or device optical component of the optical device structure 752) may be determined by simply averaging the coordinates of the positions of the alignment fiber 710a and further alignment fiber 710b. The position of the alignment fiber 710a may be $(x_1, y_1)$ and the position of the alignment fiber 710b may be $(x_2, y_2)$. The position of the optical device structure (or more specifically to the device waveguide or device optical component of the optical device structure 752) at $(x_3, y_3)$ may be determined by using equations (2) and (3):

$$x_3=(x_1+x_2)/2 \qquad (2)$$

$$y_3=(y_1+y_2)/2 \qquad (3)$$

The main optical fiber may then be aligned to the optical device structure (or more specifically to the device waveguide or device optical component of the optical device structure 752). No signal monitoring may be required.

Various embodiments may provide an easier and more repeatable way to align an optical fiber, i.e. the main optical fiber to a optical device structure. Various embodiments allow for automatic alignment using redirected input optical light as feedback.

Figure 8A:
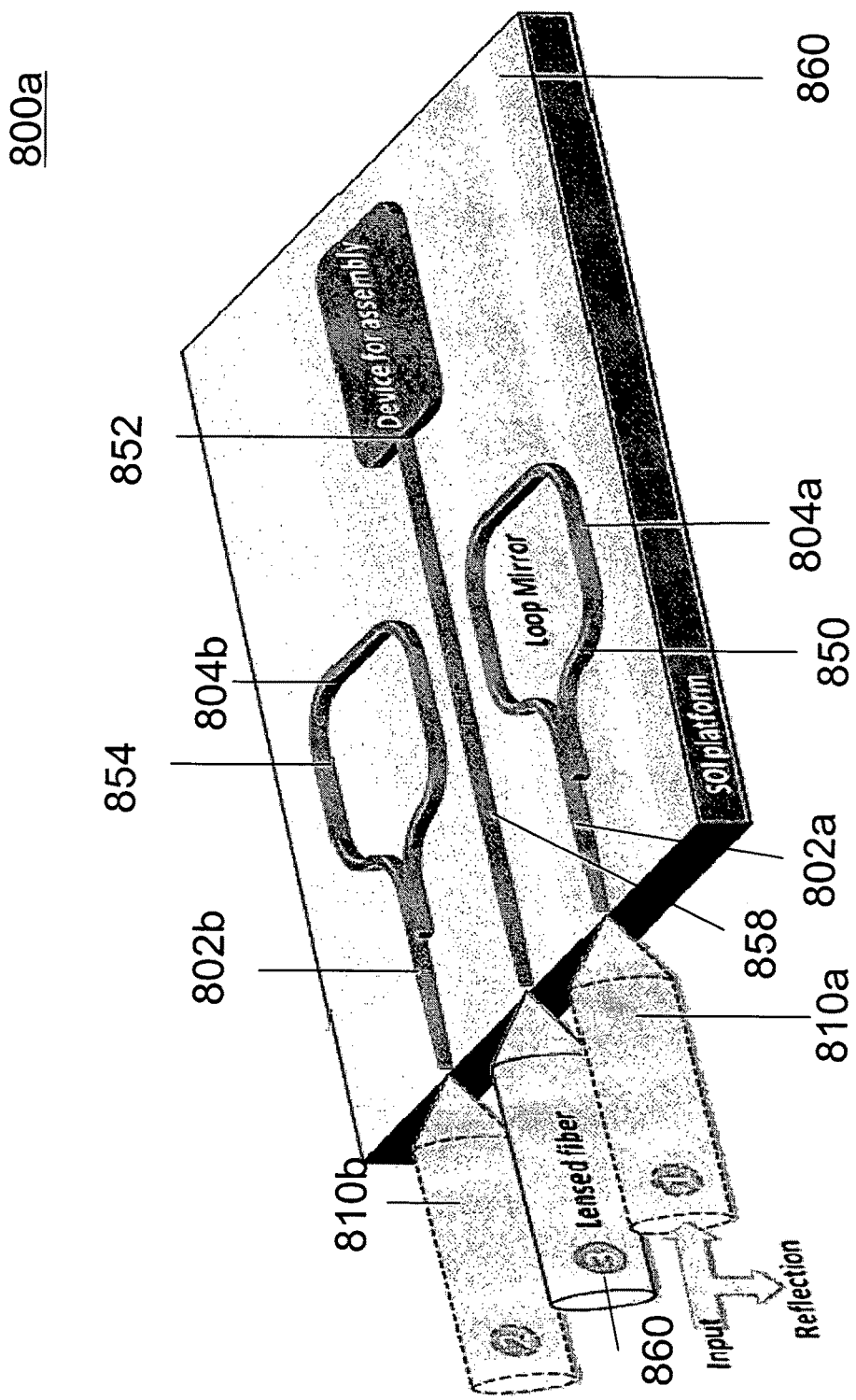
FIG. 8A is a schematic of an optical alignment assembly according to various embodiments.
Figure 8B:
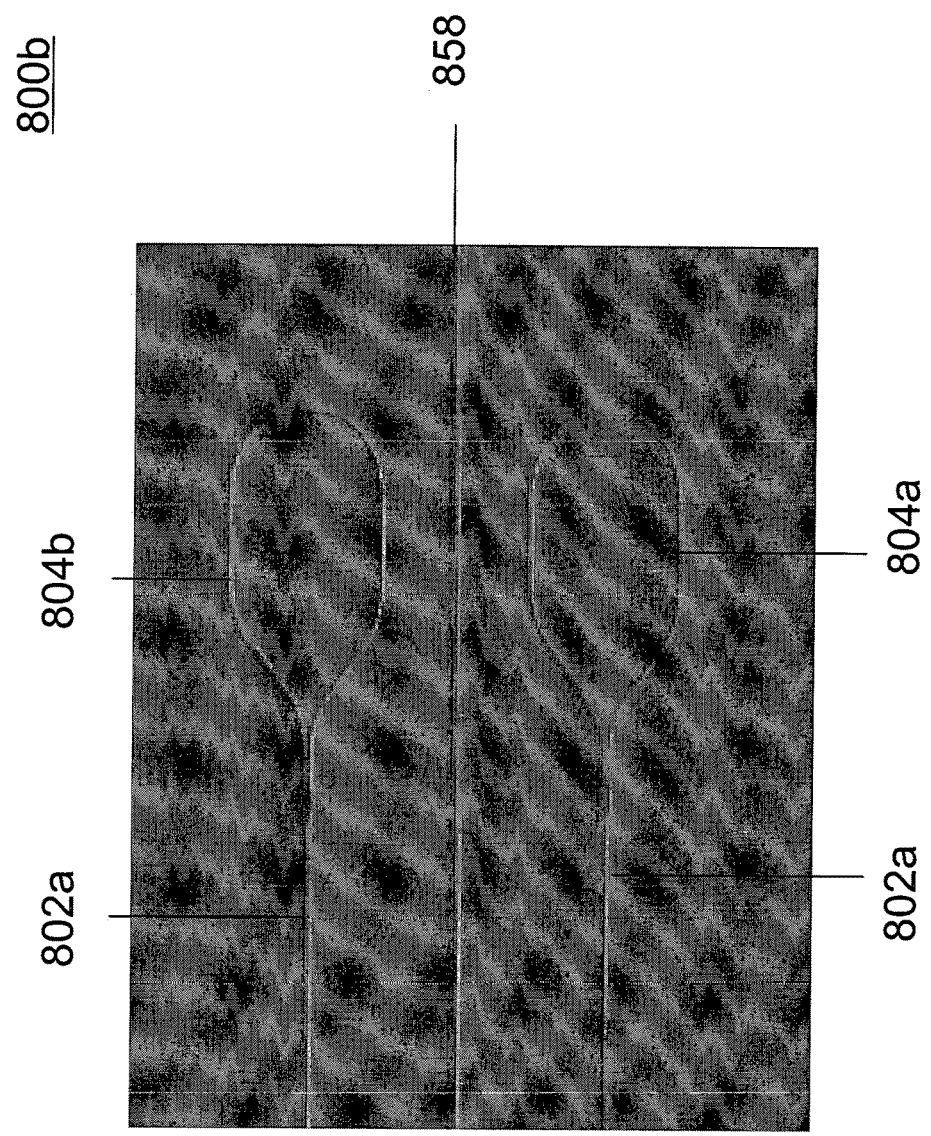
FIG. 8B is a scanning electron microscope image of the optical alignment assembly in FIG. 8A.

FIG. 8A is a schematic 800a of an optical alignment assembly according to various embodiments. FIG. 8B is a scanning electron microscope image 800b of the optical alignment assembly in FIG. 8A.

The optical alignment assembly may include an optical alignment structure 850 and a further optical alignment structure 854. The optical alignment structure 850 may be or may include the optical alignment structure illustrated in FIG. 3. Similarly, the further optical alignment structure 854 may be or may include the optical alignment structure illustrated in FIG. 3. The optical alignment assembly may further include an optical device structure 852. The optical device structure 852 may include a device waveguide 858.

The optical alignment structure 850 may include a light carrying structure 802a configured to receive an input optical light from an external optical source. The optical alignment structure 850 may further include a light redirection mechanism 804a coupled to the light carrying structure 802a. The light redirection mechanism 804a may be configured to receive the input optical light from the light carrying structure 802a. The light redirection mechanism 804a may be further configured to redirect the input optical light back to the light carrying structure 802a, the redirected input optical light configured to be detected by a detector for alignment of the optical alignment structure 850 with the external optical source.

The further optical alignment structure 854 may include a light carrying structure 802b configured to receive an input optical light from an external optical source. The further optical alignment structure 854 may further include a light redirection mechanism 804b coupled to the light carrying structure 802b The light redirection mechanism 804b may be configured to receive the input optical light from the light carrying structure 802b. The light redirection mechanism 804b may be further configured to redirect the input optical light back to the light carrying structure 802b, the redirected input optical light configured to be detected by a detector for alignment of the optical alignment structure 850 with the external optical source.

The optical alignment structures 850, 854 illustrated in FIG. 8A may be used to align the main optical fiber 852 in a similar manner as the optical alignment structures 750, 754 illustrated in FIG. 7A.

The optical alignment structures 850, 854 illustrated in FIG. 8A may be simpler. By including microring resonators, the optical alignment structure 750, 754 may be configured to output the redirected input optical light that have decreased or increased intensities (i.e. a change in intensities) at the resonant wavelengths compared to the input optical light. As such, it may be easier to distinguish the redirected input optical light from the optical light that is not coupled into the optical alignment structures 750, 754 but may be for instance, be reflected from the substrate 760. Consequently, it may be easier to align the alignment fibers 710a, 710b to the optical alignment structures 750, 754, thus making alignment of the main optical fiber 760 to the device optical structure 752 easier.

The optical alignment structures 850, 854 illustrated in FIG. 8A may be used if it is possible to distinguish the redirected input optical light detected when the alignment fibers 810a, 810b are aligned to the optical alignment structures 850, 854 and the reflected optical light when the alignment fibers 810a, 810b are not aligned to the optical alignment structures 850, 854. The redirected optical light may be distinguished from the reflected optical light by intensities, polarization etc.

In various embodiments, the optical alignment structure may generally be used to align any first structure (besides an optical device structure) to any second structure (besides a main optical fiber). In other words, the optical alignment assembly may generally include the optical alignment structure and a first structure. The optical alignment structure may be used or may be configured to align the second structure (or a part of the second structure) with the first structure (or a part of the first structure).

FIG. 9 is a schematic 900 showing a method of determining information about alignment of an alignment fiber to an optical alignment structure according to various embodiments. The method may include, in 902, coupling an input optical light to the optical alignment structure. The method may also include, in 904, detecting the input optical light redirected by the optical alignment structure. The method may further include, in 906, determining information about alignment of the alignment fiber to the optical alignment structure based on the input optical light redirected by the optical alignment structure.

In other words, a method to determine information of whether an alignment fiber is aligned to an optical alignment structure may be provided. The method may include coupling an input optical light into the optical alignment structure. The method may further include detecting the redirected input optical light (i.e. the input optical light redirected by the optical alignment structure). Information about the alignment of the alignment fiber to the optical alignment structure may be determined based on the redirected input optical light.

The optical alignment structure may include a light carrying structure configured to receive an input optical light from an external light source. The optical alignment structure may further include a light redirection mechanism coupled to the light carrying structure. The light redirection mechanism may be configured to receive the input optical light from the light carrying structure. The light redirection mechanism may be further configured to redirect the input optical light back to the light carrying structure, the redirected input optical light configured to be detected by a detector for alignment of the optical alignment structure with the external optical source. The optical alignment structure may further include a microring resonator coupled to the light redirection mechanism. The optical alignment structure may be an optical alignment structure illustrated in FIGS. 2, 3 and 4A.

However, in various embodiments, the optical alignment structure may not be required or may not be configured to redirect the input optical light back to the light carrying structure. Instead, the redirection mechanism may be configured to redirect the input optical alight light into a further light carrying structure. The optical alignment structure may include the further light carrying structure to receive the redirected input optical light and carry the redirected input optical light to a detector for alignment of the optical alignment structure with the external optical source. The further light carrying structure may be substantially parallel to the light carrying structure or may be at any angle to the light carrying structure. In various embodiments, the light may be redirected to other direction, e.g. vertical direction, by using a grating coupler or redirected to an on-chip detector. In various embodiments, the optical alignment structure and the further optical alignment structure may be coupled to form an input/output (I/O) loop. Optical light may be coupled to the optical source to the carrying structure of the optical alignment structure. The optical light may be redirected by the light redirection mechanism of the optical alignment structure (and/or the light redirection mechanism of the further optical alignment structure) to the light carrying structure of the further optical alignment structure to be detected by a detector. In other words, the optical alignment structure and further optical alignment structure may be used in conjunction. Light may be coupled into the optical alignment structure and out of the further optical alignment structure. The light may be redirected by one or two light redirection mechanisms of the optical alignment structure and/or further optical alignment structure. In various embodiments, a redirected input optical light may be in a different direction from the input optical light, whether or not the redirected input optical light and the input optical light are in opposite directions.

In various embodiments, the input optical light and the redirected input optical light (i.e. the input optical light redirected by the optical alignment structure) may be substantially the same or may be substantially different. For instance, the redirected input optical light may have decreased or increased intensities (i.e. a change in intensities) at selected resonant wavelengths or range of resonant wavelengths. The redirected input optical light may also have a different polarization from the input optical light. The detector may be configured to detect a change in a property of the redirected input optical light and the input optical light. The property may, for instance, be intensity or polarization.

In various embodiments, the method may further include providing a device optical structure at a predetermined distance from the optical alignment structure. In various embodiments, a part of the device optical structure (e.g. a device waveguide or a device optical component) may be at a predetermined distance from a part of the optical alignment structure (e.g. the light carrying structure). Various embodiments may include aligning the device optical structure (or a part of the device optical structure) to a main optical fiber using the optical alignment structure and the alignment fiber.

The method may further include moving the alignment fiber until the detected input optical light redirected by the optical alignment structure is above a predetermined intensity. The method may additionally include determining a position of the alignment fiber when the detected input optical light redirected by the optical alignment structure is above the predetermined intensity. The method may also include aligning a main optical fiber to the device optical structure (or a part of the device optical structure) based on the position of the alignment fiber and the predetermined distance.

The optical structure (or a part of the device optical structure) may be lateral to the optical alignment structure (or a part of the optical alignment structure). The alignment fiber may thus be moved laterally until the detected input optical light redirected by the optical alignment structure is above the predetermined intensity.

In various embodiments, after the alignment fiber is aligned to the optical alignment structure, the position of the optical device structure (or a part, of the device optical structure) may be determined based on the positions of the alignment fiber as well as the predetermined distance.

The method may further include providing a further optical alignment structure at a further predetermined distance to the device optical structure. The method may also include coupling the input optical light to a further optical alignment structure. The method may additionally include detecting a further input optical light redirected by the further optical alignment structure. The method may further include determining information about alignment of a further alignment fiber to the further optical alignment structure based on the further input optical light redirected by the optical alignment structure.

The method may include moving the further alignment fiber until the detected further input optical light redirected by the further optical alignment structure is above a further predetermined intensity. The method may further include determining a further position of the further alignment fiber when the detected further input optical light redirected by the further optical alignment structure is above the further predetermined intensity. The method may also include aligning the main optical fiber to the device optical structure (or a part of the device optical structure) further based on the further position of the further alignment fiber and the further predetermined distance. In various embodiments, after the alignment fiber is aligned to the optical alignment structure and the further alignment fiber is aligned to the further alignment structure, the position of the optical device structure (or a part of the device optical structure) may be determined based on the positions of the optical alignment structure and further optical alignment structure as well as the predetermined distance and further predetermined distance. The alignment optical structure, the further alignment optical structure and the optical device structure (or a part of the device optical structure) may not be required to be lateral to one another.

In various embodiments, the alignment fiber may be fixed at the predetermined distance to the main optical fiber, e.g. held together by a holding structure. The method may further include moving the alignment fiber and the main optical fiber until the detected input optical light redirected by the optical alignment structure is beyond a predetermined intensity. The alignment fiber and the main optical fiber may be moved laterally until the detected input optical light redirected by the optical alignment structure is beyond the predetermined intensity.

In various embodiments, the method may include providing a further optical alignment structure at a further predetermined distance to the device optical structure. The method may also include coupling the input optical light to a further optical alignment structure. The method may additionally include detecting a further input optical light redirected by the further optical alignment structure. The method may further include determining information about alignment of a further alignment fiber to the further optical alignment structure based on the further input optical light redirected by the further optical alignment structure.

The further alignment fiber may be fixed at the further predetermined distance to the main optical fiber. The method may further include moving the alignment fiber, the further alignment fiber and the main optical fiber until the detected input optical light redirected by the optical alignment structure is beyond the predetermined intensity and the detected further input optical light redirected by the further optical alignment structure is beyond a further predetermined intensity.

Methods described herein may further contain analogous features of any device described herein. Correspondingly, devices described herein may further contain analogous features of any methods described herein.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. An optical alignment assembly comprising:
   an optical alignment structure comprising:
      a waveguide configured to receive an input optical light;
      a loop mirror coupled to the waveguide, the loop mirror configured to receive the input optical light from the waveguide and further configured to redirect the input optical light back to the waveguide;
      a microring resonator coupled to the loop mirror, the microring resonator configured to change the input optical light received from the waveguide so that the redirected input optical light at predetermined resonant wavelengths has a change in intensity to the input optical light received from the waveguide;
   an optical device structure comprising a device waveguide; and
   a further optical alignment structure comprising:
      a further waveguide configured to receive a further input optical light;
      a further loop mirror coupled to the further waveguide, the further loop mirror configured to receive the further input optical light from the further waveguide and further configured to redirect the further input optical light back to the further waveguide;
      a further microring resonator coupled to the further loop mirror, the further microring resonator configured to change the further input optical light received from the further waveguide so that the redirected further input optical light at predetermined resonant wavelengths has a change in intensity to the further input optical light received from the further waveguide;
   wherein the optical alignment structure and the further optical alignment structure are on opposite sides of the optical device structure;
   wherein the optical alignment structure is at a predetermined distance to the optical device structure;
   wherein the further optical alignment structure is at a further predetermined distance to the optical device structure; and
   wherein the predetermined distance is equal to the further predetermined distance.

2. The optical alignment assembly according to claim 1, wherein the optical alignment structure is lateral to the optical device structure.

3. The optical alignment assembly according to claim 1, further comprising:
   an external optical source configured to emit the optical light; and
   a detector configured to detect the redirected input optical light.

4. The optical alignment assembly according to claim 3, wherein the detector is a photodetector.

5. The optical assembly according to claim 1, wherein the microring resonator is waveguide cross-coupled to the loop mirror.

6. The optical assembly according to claim 1, wherein the microring resonator is coupled to the loop mirror via a single coupling portion.

7. The optical assembly according to claim 1, wherein the waveguide is configured to carry the input optical light in a first direction; and wherein the loop mirror is configured to redirect the input optical light back to the waveguide in a second direction substantially opposite the first direction.

8. The optical assembly according to claim 1, wherein the loop mirror comprises a waveguide comprising a body with a first end and the second end, the body comprising a loop such that the first end and the second end are on the same side of the body.

9. The optical assembly according to claim 8, wherein the first end and the second end are directly coupled to the waveguide.

10. The optical assembly according to claim 1, wherein the loop mirror is configured such that the input optical light received from the waveguide is split into a first component travelling in a first direction along the loop mirror and a second component travelling in a second direction along the loop mirror, the second direction along the loop mirror substantially opposite the first direction along the loop mirror.

11. The optical assembly according to claim 1, wherein the microring resonator is configured to decrease intensity of the input optical light received from the waveguide such that the intensity of the redirected input optical light has a lower intensity than the input optical light received from the waveguide.

* * * * *

UNITED STATES PATENT AND TRADEMARK OFFICE
CERTIFICATE OF CORRECTION

PATENT NO. : 10,048,453 B2
APPLICATION NO. : 14/760524
DATED : August 14, 2018
INVENTOR(S) : Chao Li et al.

Page 1 of 1

It is certified that error appears in the above-identified patent and that said Letters Patent is hereby corrected as shown below:

On the Title Page

Item (30), Foreign Application Priority Data:
Please replace priority application number "201300325" with --201300325-6--

Signed and Sealed this
Second Day of October, 2018

Andrei Iancu
*Director of the United States Patent and Trademark Office*